(12) United States Patent
Gomez, Sr. et al.

(10) Patent No.: US 9,600,808 B1
(45) Date of Patent: *Mar. 21, 2017

(54) SECURE PAYMENT CARD, METHOD AND SYSTEM

(75) Inventors: William Gomez, Sr., Houston, TX (US); William Gomez, Jr., Houston, TX (US); Oscar J. Gomez, Houston, TX (US)

(73) Assignee: EPIC ONE TEXAS, LLC, Houston, TX (US)

( * ) Notice: Subject to any disclaimer, the term of this patent is extended or adjusted under 35 U.S.C. 154(b) by 894 days.

This patent is subject to a terminal disclaimer.

(21) Appl. No.: 13/530,620

(22) Filed: Jun. 22, 2012

Related U.S. Application Data

(60) Provisional application No. 61/500,941, filed on Jun. 24, 2011.

(51) Int. Cl.
| | | |
|---|---|---|
| *G06Q 20/00* | (2012.01) | |
| *G06Q 30/00* | (2012.01) | |
| *H04N 21/441* | (2011.01) | |
| *H04M 17/00* | (2006.01) | |

(52) U.S. Cl.
CPC ............ *G06Q 20/00* (2013.01); *G06Q 30/00* (2013.01); *H04M 17/30* (2013.01); *H04N 21/441* (2013.01); *H04M 2017/2531* (2013.01)

(58) Field of Classification Search
CPC ..... H04L 63/08; H04L 9/3231; H04L 63/083; H04L 63/0861; H04L 2209/805; H04L 9/0822; H04L 63/20; H04L 2463/102; H04L 63/0492; H04L 9/0819; H04L 9/0841; H04L 9/3247; H04L 9/3297; H04L 2209/80; G07C 9/00087; G07C 2009/00793; G07C 2209/04; G07C 9/00571; G07C 2209/64; G07C 2009/00095; G07C 9/00174;
(Continued)

(56) References Cited

U.S. PATENT DOCUMENTS

| | | |
|---|---|---|
| 4,353,064 A | 10/1982 | Stamm |
| 4,614,861 A | 9/1986 | Pavlov et al. |
| 4,700,055 A | 10/1987 | Kashkashian, Jr. |

(Continued)

OTHER PUBLICATIONS

Chip Terms Explained A Guide to Smart Card Terminology.*
(Continued)

*Primary Examiner* — Steven Kim
*Assistant Examiner* — El Mehdi Oussir
(74) *Attorney, Agent, or Firm* — Howison & Arnott, LLP

(57) ABSTRACT

A payment card system uses a static payment card identifying number and generates, for each attempted transaction, an authentication cryptogram based at least upon a seed value stored within the payment card and further based upon a temporal signal value that changes for each attempted use of the payment card. The authentication cryptogram may be alpha-numerically encoded, preferably using a radix-32 coding to provide 5-bits of information for each character or symbol, and may be communicated in a 26-character payment card account name field instead of communicating a payment account name in said payment card account name field, to thus convey up to 130-bits of information while maintaining compatibility with existing point-of-sale equipment and payment system infrastructure.

28 Claims, 15 Drawing Sheets

(58) Field of Classification Search
CPC ............ G07C 2209/02; G07C 9/00103; G07C 9/00111; G09C 5/00; H04M 1/67; H04M 1/72527
USPC .................................................... 705/75, 46
See application file for complete search history.

(56) References Cited

U.S. PATENT DOCUMENTS

| | | | |
|---|---|---|---|
| 4,701,601 A | 10/1987 | Francini et al. | |
| 4,720,860 A | 1/1988 | Weiss | |
| 4,786,791 A | 11/1988 | Hodama | |
| 4,797,542 A | 1/1989 | Hara | |
| 5,347,580 A | 9/1994 | Molva et al. | |
| 5,478,994 A | 12/1995 | Rahman et al. | |
| 5,585,787 A | 12/1996 | Wallerstein | |
| 5,623,552 A | 4/1997 | Lane | |
| 5,742,684 A | 4/1998 | Labaton et al. | |
| 6,163,771 A * | 12/2000 | Walker ................... | G06Q 20/04 705/18 |
| 6,182,894 B1 | 2/2001 | Hackett et al. | |
| 6,233,340 B1 * | 5/2001 | Sandru ................... | G06Q 20/04 283/17 |
| 6,324,526 B1 | 11/2001 | D'Agostino | |
| 6,592,044 B1 | 7/2003 | Wong et al. | |
| 6,615,353 B1 | 9/2003 | Hashiguchi | |
| 6,641,050 B2 | 11/2003 | Kelley et al. | |
| 6,883,717 B1 | 4/2005 | Kelley et al. | |
| 7,051,929 B2 | 5/2006 | Li | |
| 7,210,621 B2 | 5/2007 | Woronec | |
| 7,580,898 B2 | 8/2009 | Brown et al. | |
| 7,793,851 B2 | 9/2010 | Mullen | |
| 7,828,220 B2 | 11/2010 | Mullen | |
| 7,840,486 B2 | 11/2010 | D'Agostino | |
| 7,866,552 B2 | 1/2011 | Smets et al. | |
| 8,266,432 B2 | 9/2012 | Asghari-Kamrani et al. | |
| 8,307,210 B1 | 11/2012 | Duane | |
| 8,827,154 B2 | 9/2014 | Hammad | |
| 2001/0047335 A1 | 11/2001 | Arndt et al. | |
| 2002/0021001 A1 * | 2/2002 | Stratford ................. | G06K 7/14 283/74 |
| 2003/0028481 A1 * | 2/2003 | Flitcroft ................. | G06Q 20/00 705/39 |
| 2004/0035942 A1 | 2/2004 | Silverman | |
| 2004/0083184 A1 | 4/2004 | Tsuei et al. | |
| 2004/0162732 A1 | 8/2004 | Rahim et al. | |
| 2005/0171898 A1 | 8/2005 | Bishop et al. | |
| 2006/0091223 A1 | 5/2006 | Zellner et al. | |
| 2007/0027900 A1 * | 2/2007 | Toyoda ................. | G06F 19/705 |
| 2007/0078783 A1 * | 4/2007 | Shatford ........................ | 705/67 |
| 2007/0124589 A1 | 5/2007 | Sutton et al. | |
| 2007/0239622 A1 * | 10/2007 | Routhenstein .......... | G06Q 20/04 705/76 |
| 2007/0250920 A1 | 10/2007 | Lindsay | |
| 2008/0029607 A1 * | 2/2008 | Mullen ................. | G06K 19/077 235/492 |
| 2008/0035738 A1 | 2/2008 | Mullen | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0065555 A1 | 3/2008 | Mullen | |
| 2008/0071681 A1 | 3/2008 | Khalid | |
| 2008/0130876 A1 | 6/2008 | Etienne et al. | |
| 2008/0201265 A1 * | 8/2008 | Hewton ................. | G06Q 20/04 705/67 |
| 2008/0302869 A1 | 12/2008 | Mullen | |
| 2009/0048971 A1 | 2/2009 | Hathaway et al. | |
| 2009/0159667 A1 | 6/2009 | Mullen et al. | |
| 2009/0159668 A1 | 6/2009 | Mullen et al. | |
| 2009/0159669 A1 | 6/2009 | Mullen et al. | |
| 2009/0159670 A1 | 6/2009 | Mullen et al. | |
| 2009/0159672 A1 | 6/2009 | Mullen et al. | |
| 2009/0159681 A1 | 6/2009 | Mullen et al. | |
| 2009/0159682 A1 | 6/2009 | Mullen et al. | |
| 2009/0159696 A1 | 6/2009 | Mullen | |
| 2009/0159701 A1 | 6/2009 | Mullen et al. | |
| 2009/0159702 A1 | 6/2009 | Mullen | |
| 2009/0159708 A1 | 6/2009 | Mullen et al. | |
| 2009/0164380 A1 * | 6/2009 | Brown ................. | G06Q 20/341 705/65 |
| 2009/0183246 A1 | 7/2009 | Kokologiannakis | |
| 2009/0308921 A1 | 12/2009 | Mullen | |
| 2010/0024025 A1 | 1/2010 | Yoshida et al. | |
| 2010/0131764 A1 | 5/2010 | Goh | |
| 2011/0010398 A1 | 1/2011 | Gruenwald | |
| 2011/0258452 A1 * | 10/2011 | Coulier ................... | G06F 21/31 713/171 |
| 2012/0078795 A1 * | 3/2012 | Mann, III .............. | G06Q 20/04 705/44 |
| 2014/0108813 A1 | 4/2014 | Pauker et al. | |

OTHER PUBLICATIONS

Bank of America, "The free and easy way to protect yourself when you shop online," downloaded Feb. 28, 2011 from http://www.bankofamerica.com/privacy/index.cfm?template=learn_about_shopsafe, 1 page.

Bernard, T. "Credit Cards Soon to Get a Makeover," The New York Times, Oct. 21, 2010, 3 pages, downloaded Oct. 25, 2010 from http://www.nytimes.com/2010/10/22/your-money/credit-and-debit-cards/22cards.html?_r=1&pa . . . .

Card_Lab "Snap Switch," downloaded Jun. 20, 2011 from http://www.cardlab.com/Card-Activation.html, 1 page.

Card_Lab "The Dynamic Magnetic Stripe," downloaded Jun. 20, 2011 from http://www.cardlab.com/Dynamic-Magnetic-Stripe.html, 1 page.

Dynamics Inc. "New Dynamics Payment Card Eradicates Significant US Fraud," Press Release Oct. 19, 2010, 2 pages, downloaded Oct. 25, 2010 from http://www.poweredcards.com/dyn_pr7.php.

ISO/IEC, "Information technology—Identification cards—Financial transaction cards," International Standard, Jul. 1, 2006, Ref. No. ISO/IEC 7813:2006(E), 12 pages.

Sidel, R. and Raice, S. "Pay-by-Phone Dialed Back," The Wall Street Journal, May 4, 2011, 2 pages.

Sposito, S. "Cost Just One Hurdle in U.S. for Interactive Cards," American Banker, Oct. 15, 2010, 2 pages downloaded Oct. 25, 2010 from http://www.americanbanker.com/issues/175_198/cost-hurdle-interactive-cards-1027092-1.html?z . . . .

Wikipedia, "Cryptographic hash function," downloaded May 25, 2011 from http://en.wikipedia.org/wiki/Cryptographic_hash_function, 8 pages.

Visa; Visa Best Practices for Tokenization Version 1.0; Visa Best Practices; Jul. 14, 2010, 4 pages.

Tim Horton and Robert McMillon; A Primer on Payment Security Technologies: Encryption and Tokenization; First Data Corporation; copyright 2011 (although possibly available as early as Sep. 22, 2010); 11 pages.

U.S. Appl. No. 13/530,627, filed Jun. 22, 2012, entitled Secure Payment Card and Method; William Gomez, Sr.; 53 pages (non-published).

U.S. Appl. No. 13/530,630, filed Jun. 22, 2012, entitled Secure Payment Card Authentication Server, Method and System; William Gomez, Sr.; 52 pages (non-published).

U.S. Appl. No. 13/530,640, filed Jun. 22, 2012, entitled Secure Payment Card Authentication Server, System and Method; William Gomez, Sr.; 53 pages (non-published).

ISO 8583, downloaded from Wikipedia on Aug. 4, 2015, in another application as representing information published Feb. 2011 (14 pages).

* cited by examiner

EXEMPLARY GENERATION OF
AUTHENTICATION CRYPTOGRAM                                290

FIG. 15

606 Example mapping tables for encoding a binary token into an alphanumeric code

| Binary | Dec | Hex | Map 1 | Map 2 | Map 3 | Map 4 | Map 5 | Map 6 | Map 7 | Map 8 | Map 9 | Map 10 | Map 11 | Map 12 | Map 13 |
|---|---|---|---|---|---|---|---|---|---|---|---|---|---|---|---|
| 00000 | 00 | 00 | 0 | V | 1 | W | 2 | X | 3 | Y | 4 | Z | 0 | 0 | J |
| 00001 | 01 | 01 | 1 | U | 2 | V | 3 | W | 4 | X | 5 | Y | 2 | 1 | Z |
| 00010 | 02 | 02 | 2 | T | 3 | U | 4 | V | 5 | W | 6 | X | 3 | 3 | D |
| 00011 | 03 | 03 | 3 | S | 4 | T | 5 | U | 6 | V | 7 | W | 4 | 4 | 4 |
| 00100 | 04 | 04 | 4 | R | 5 | S | 6 | T | 7 | U | 8 | V | 5 | 5 | T |
| 00101 | 05 | 05 | 5 | Q | 6 | R | 7 | S | 8 | T | 9 | U | 6 | 6 | Y |
| 00110 | 06 | 06 | 6 | P | 7 | Q | 8 | R | 9 | S | A | T | 7 | 7 | K |
| 00111 | 07 | 07 | 7 | O | 8 | P | 9 | Q | A | R | B | S | 8 | 8 | B |
| 01000 | 08 | 08 | 8 | N | 9 | O | A | P | B | Q | C | R | 9 | 9 | I |
| 01001 | 09 | 09 | 9 | M | A | N | B | O | C | P | D | Q | A | A | F |
| 01010 | 0A | 0A | A | L | B | M | C | N | D | O | E | P | B | B | O |
| 01011 | 0B | 0B | B | K | C | L | D | M | E | N | F | O | C | C | W |
| 01100 | 0C | 0C | C | J | D | K | E | L | F | M | G | N | D | D | C |
| 01101 | 0D | 0D | D | I | E | J | F | K | G | L | H | M | E | E | 5 |
| 01110 | 0E | 0E | E | H | F | I | G | J | H | K | I | L | F | F | U |
| 01111 | 0F | 0F | F | G | G | H | H | I | I | J | J | K | G | G | H |
| 10000 | 10 | 10 | G | F | H | G | I | H | J | I | K | J | H | H | 3 |
| 10001 | 11 | 11 | H | E | I | F | J | G | K | H | L | I | I | I | N |
| 10010 | 12 | 12 | I | D | J | E | K | F | L | G | M | H | J | J | 1 |
| 10011 | 13 | 13 | J | C | K | D | L | E | M | F | N | G | K | K | P |
| 10100 | 14 | 14 | K | B | L | C | M | D | N | E | O | F | L | L | 6 |
| 10101 | 15 | 15 | L | A | M | B | N | C | O | D | P | E | M | M | E |
| 10110 | 16 | 16 | M | 9 | N | A | O | B | P | C | Q | D | N | N | S |
| 10111 | 17 | 17 | N | 8 | O | 9 | P | A | Q | B | R | C | O | O | 2 |
| 11000 | 18 | 18 | O | 7 | P | 8 | Q | 9 | R | A | S | B | P | P | G |
| 11001 | 19 | 19 | P | 6 | Q | 7 | R | 8 | S | 9 | T | A | Q | Q | L |
| 11010 | 1A | 1A | Q | 5 | R | 6 | S | 7 | T | 8 | U | 9 | R | R | R |
| 11011 | 1B | 1B | R | 4 | S | 5 | T | 6 | U | 7 | V | 8 | S | S | A |
| 11100 | 1C | 1C | S | 3 | T | 4 | U | 5 | V | 6 | W | 7 | T | T | 0 |
| 11101 | 1D | 1D | T | 2 | U | 3 | V | 4 | W | 5 | X | 6 | U | U | X |
| 11110 | 1E | 1E | U | 1 | V | 2 | W | 3 | X | 4 | Y | 5 | V | V | V |
| 11111 | 1F | 1F | V | 0 | W | 1 | X | 2 | Y | 3 | Z | 4 | W | W | Q |
| Unused Symbols: | | | W,X,Y,Z | W,X,Y,Z | 0,X,Y,Z | 0,X,Y,Z | 0,1,Y,Z | 0,1,Y,Z | 0,1,2,Z | 0,1,2,Z | 0,1,2,3 | 0,1,2,3 | 1,X,Y,Z | 2,X,Y,Z | M,7,8,9 |

SECURE PAYMENT CARD, METHOD AND SYSTEM

CROSS-REFERENCE TO RELATED APPLICATION(S)

This application claims the benefit under 35 U.S.C. §119 (e) of U.S. Provisional Application No. 61/500,941, filed Jun. 24, 2011, entitled "Secure Payment Card, Method and System for Using Same" by William Gomez, Sr., William Gomez, Jr., and Oscar J. Gomez, which application is hereby incorporated by reference.

This application discloses subject matter that is also disclosed in the following co-pending U. S. Patent Applications, each filed on even date herewith, and each of which is hereby incorporated by reference in its entirety:

U.S. application Ser. No. 13/530,627 entitled "Secure Payment Card and Method" by William Gomez, Sr., William Gomez, Jr., and Oscar J. Gomez;

U.S. application Ser. No. 13/530,630 entitled "Secure Payment Card Authentication Server, Method and System" by William Gomez, Sr., William Gomez, Jr., and Oscar J. Gomez; and U.S. application Ser. No. 13/530,640 entitled "Secure Payment Card Authentication Server, System and Method" by William Gomez, Sr., William Gomez, Jr., and Oscar J. Gomez;

BACKGROUND

The problems of fraud and identity theft that result from the use of payment cards, such as credit and debit cards, are increasing throughout the world. In recent years, reported losses due to identity theft in the U.S. alone were more than $48 to $315 billion dollars, the majority coming from credit/debit card transactions. In 2009, the number of physical credit/debit cards in U.S. circulation exceeded 1.5 billion cards, and there were tens of billions of credit card and debit card purchase transactions.

With each and every one of those payment card transactions, whether transacted in a physical store or as an online purchase, each cardholder typically leaves behind all the information necessary for another person to be able to make an unauthorized payment card transaction. For example, the assigned 16-digit credit card number and 3-digit security code that are embossed on many credit cards are fixed and never change, and are easily and quickly readable by dishonest clerks, cashiers, and other personnel.

Many consumers carry more than one payment card. Not only is this inconvenient, but if a wallet or purse containing a consumer's cards is lost, each payment card account is susceptible to having fraudulent charges made by an unscrupulous person who might find the card.

SUMMARY OF EMBODIMENTS OF THE INVENTION

Payment card transaction theft and fraud may be greatly reduced, if not virtually eliminated, in a payment card system that utilizes a secure authentication cryptogram which is generated uniquely for each attempted use of the payment card, and which expires within a short period of time thereafter. An exemplary payment card system uses a static payment card identifying number. The authentication cryptogram is generated based upon a seed value stored within the payment card, and further based upon a temporal signal value which changes for each attempted use of the payment card, and may be alpha-numerically encoded to provide a far greater number of "bits" of information than could be provided, for example, using a decimal number encoding, for a given number of characters or symbols. The authentication cryptogram may be communicated in a payment card account name field to provide a larger number of characters or symbols representing the authentication cryptogram than could be transmitted using a traditional (i.e., 3-character) security code field, or using a traditional (i.e., 16-character) account number field, or even using both the account number and security code fields (i.e., a total of 19 characters).

The authentication cryptogram may be alpha-numerically encoded using a radix-32 coding to convey 5-bits of information for each character or symbol, and if transmitted using a traditional 26-character account name field, may thus convey up to 130-bits of information.

The static payment card identifying number may represent a live (i.e., "actual") credit card number or other payment card (e.g., debit card) account number. Unlike a traditional payment card account, fraudulent use would not be possible because any attempted transaction would not be approved without an appropriate authentication cryptogram generated uniquely for such transaction. In some embodiments, the static payment card identifying number identifies the payment card, but does not represent a live account, in which case one or more actual credit card accounts (or other payment card accounts) are linked to the payment card identifying number. In such a case, the payment card does not contain any actual credit card account number information, but still provides the ability to utilize such credit card accounts without having to carry the actual credit cards themselves. Since there is no need to carry the actual credit cards, they may be stored safely at home or in a safe deposit box. Such linked accounts may include any of the major credit card accounts, such as VISA, MasterCard, Discover, ExxonMobil, AMEX, Sears, etc.

No changes in the payment system infrastructure need be made by either the point-of-sale merchant or the card issuer. For example, such a payment card may use a programmable magnetic stripe or contactless technology to provide total compatibility with existing POS equipment.

In one aspect, a secure payment card method includes providing a temporal signal value within a payment card upon presentation of a valid credential for a payment card user, and generating an authentication cryptogram based at least in part on a seed value stored within the payment card and the temporal signal value. The method also includes communicating a payment card identifying number to a payment processing system, and communicating the authentication cryptogram in a payment card account name field to the payment processing system.

In another aspect, a secure payment card includes an input device operable to receive a credential for a payment card user, a temporal value circuit operable to generate a temporal signal value, and a storage device operable to store a seed value corresponding to the secure payment card. The secure payment card also includes a processor operable to verify the credential for the payment card user and, upon verification of a valid credential, to generate an authentication cryptogram based at least in part on the seed value and the temporal signal value. The secure payment card also includes an interface device operable to communicate a payment card identifying number in a payment card account number field to a payment processing system, and further operable to communicate the authentication cryptogram in a payment card account name field to the payment processing system.

The foregoing is a summary and thus contains, by necessity, simplifications, generalizations, and omissions of detail. Consequently, those skilled in the art will appreciate that the foregoing summary is illustrative only and that it is not intended to be in any way limiting of the invention, which is defined solely by the claims.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 15 is a chart depicting several exemplary radix-32 alpha-numeric codes.

DETAILED DESCRIPTION

Figure 1:
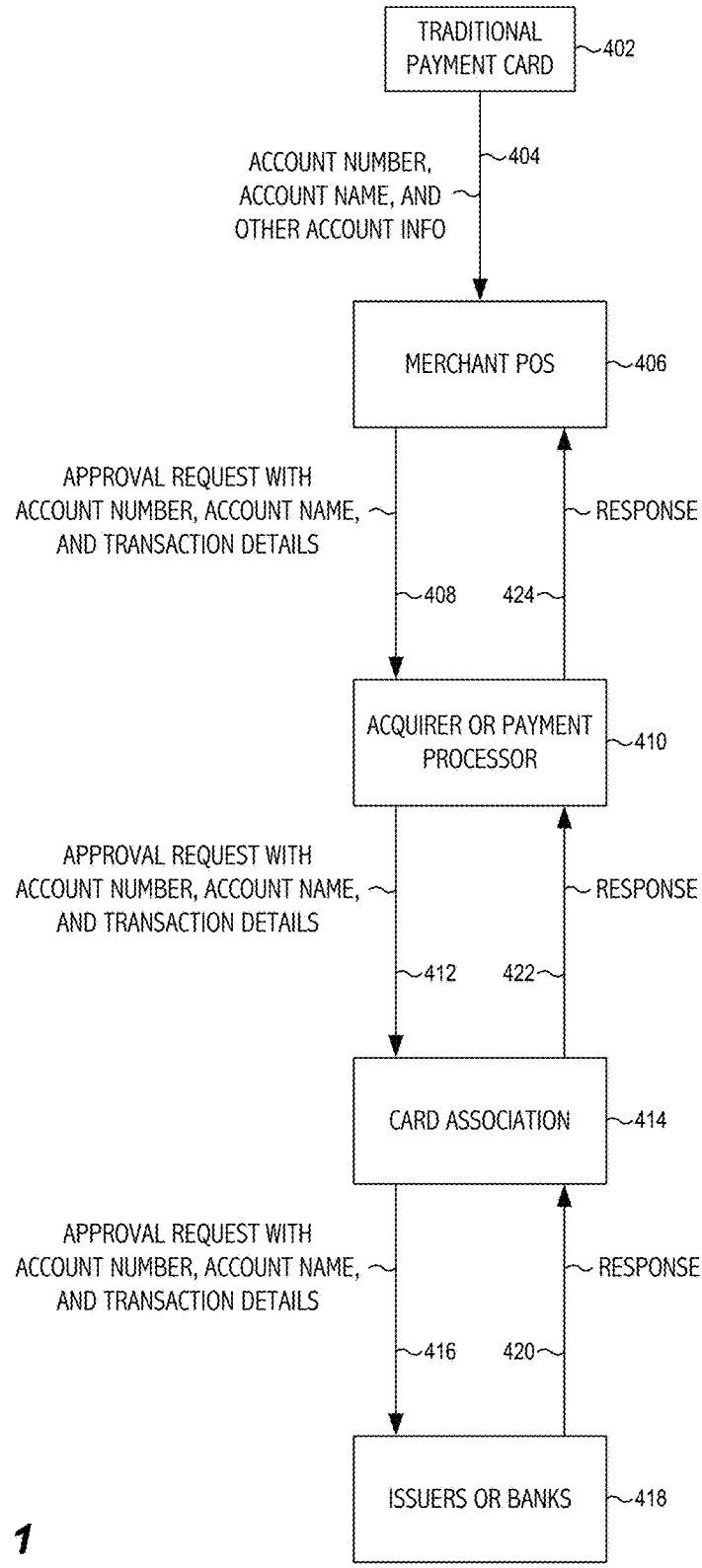
FIG. 1, labeled prior art, is a block diagram depicting a traditional payment system and transaction flow related to purchase transaction approval.

FIG. 1 is a block diagram depicting a traditional payment system 400 and transaction flow related to purchase transaction approval at a retail merchant. A traditional payment card 402, such as a credit card or debit card, includes a magnetic stripe on which is permanently encoded certain account information, including the account number, security code, account name, expiration date. This account information (labeled 404) is communicated to a merchant 406, such as by swiping the payment card 402 through a magnetic card reader on a point-of-sale (POS) terminal (not shown).

The merchant 406 combines the account information 404 with transaction information, such as the merchant identification information, the date and time of the transaction, and the amount to be charged, and forms an approval request 408 which is communicated to an acquirer/payment processor 410, which may also be referred to herein as simply an "acquirer" 410. Such an approval request 408 may be encrypted to maintain secrecy of the information, and is usually transmitted by a modem connection or internet connection to the acquirer 410. The acquirer 410 functions as an intermediary between a merchant and a card association, such as VISA, MasterCard, Discover, or American Express, to more easily provide for a merchant to be able to accept many different types of payment cards, without each merchant having to establish electronic connections with multiple card associations, card issuers, or other entities.

The acquirer 410 analyzes the account number conveyed in the inbound approval request 408 to determine the appropriate card association to next process the transaction approval request. The acquirer 410 then combines the information provided in the approval request 408 with additional information identifying the acquirer 410, and forms an approval request 412 which is communicated to a card association 414 corresponding to the payment card being used. The card association 414 functions as an intermediary between an acquirer 410 and an issuing institution such as a bank (e.g., Citicorp, JPMorganChase, Capital One), a retail merchant (e.g., Sears, JC Penney), a refining retailer (e.g., ExxonMobil, Shell), or some other card issuer who actually provides the underlying credit for the payment card account.

The card association 414 combines the information provided in the approval request 412 with additional information identifying the card association 414, and forms an approval request 416 which is communicated to the issuer 418 of the payment card being used. The issuer 418 then processes the approval request to either approve or deny the particular transaction, and communicates a response 420 back to the card association 414. The card association 414 similarly provides a response 422 back to the acquirer 410, who likewise provides a response 424 back to the merchant 406, who completes the transaction if the approval request 408 was approved, or aborts the transaction if the approval request 408 was denied.

The various approval requests and responses communicated between the major institutions, such as approval requests 412, 416 and responses 420, 422 are usually transmitted over the internet, and are usually encrypted to maintain secrecy of the information during transit. The processing of transaction approval requests by the acquirer 410, card association 414, and issuer 418 are largely automated, and do not usually expose the payment card information to employees of these institutions. Moreover, such employees are usually charged with safekeeping such information that they may be exposed to, and fraudulent misuse of such information is an infrequent problem by such employees.

However, the risk is much higher regarding interactions with the merchant 406, whose employees may have access to the physical payment card, even if for only a brief moment, and can either manually copy the information from the card, or discreetly use a credit card "skimmer" to quickly capture all the information on the card's magnetic stripe. Likewise, interactions with online merchants can present similar risks, either due to personnel improprieties at the merchant, or due to internet attacks that compromise the computer systems of such merchants.

In an improved payment card system, the information that can be gleaned from a payment card, either by visually observing information printed or embossed on the card, or by reading the magnetic stripe, is rendered useless for making an unauthorized subsequent transaction. Such systems are described in several embodiments herein, each described as an EPIC payment system. In an exemplary embodiment, an EPIC payment card uses a fully static payment card number, but generates an authentication cryptogram for each attempted transaction only after the cardholder successfully presents a credential, such as a fingerprint or PIN number, into the payment card.

The payment card number may represent a "live" credit card number or other payment card account number, but in certain embodiments may represent an identifying number for an EPIC account which is not itself a live payment card account, but to which are linked one or more live payment card accounts.

The authentication cryptogram is based at least upon a seed value stored within the payment card and a temporal signal value, such as the date/time of the attempted purchase, and is preferably valid for only a short lifetime after the date/time. The authentication cryptogram may be alpha-numerically encoded in the account name field for the payment card and written to a re-writable magnetic stripe on the back of the payment card. The card holder then swipes the payment card through a POS terminal at the merchant just like a traditional magnetic stripe payment card. Even though the information communicated to the merchant and "left behind" on every purchase transaction may be readily observable, the generated authentication cryptogram preferably expires after a few seconds and preferably can only be used on a single transaction. Attempting to re-use a previously generated authentication cryptogram will normally render a purchase transaction authorization denial (except perhaps for certain pre-authorized recurring transactions). Moreover, the encoding of the authentication cryptogram renders it extremely difficult for an unauthorized party, without knowledge of the seed value corresponding to the payment card, to generate a new authentication cryptogram in attempt to authorize a future fraudulent transaction.

Figure 2:
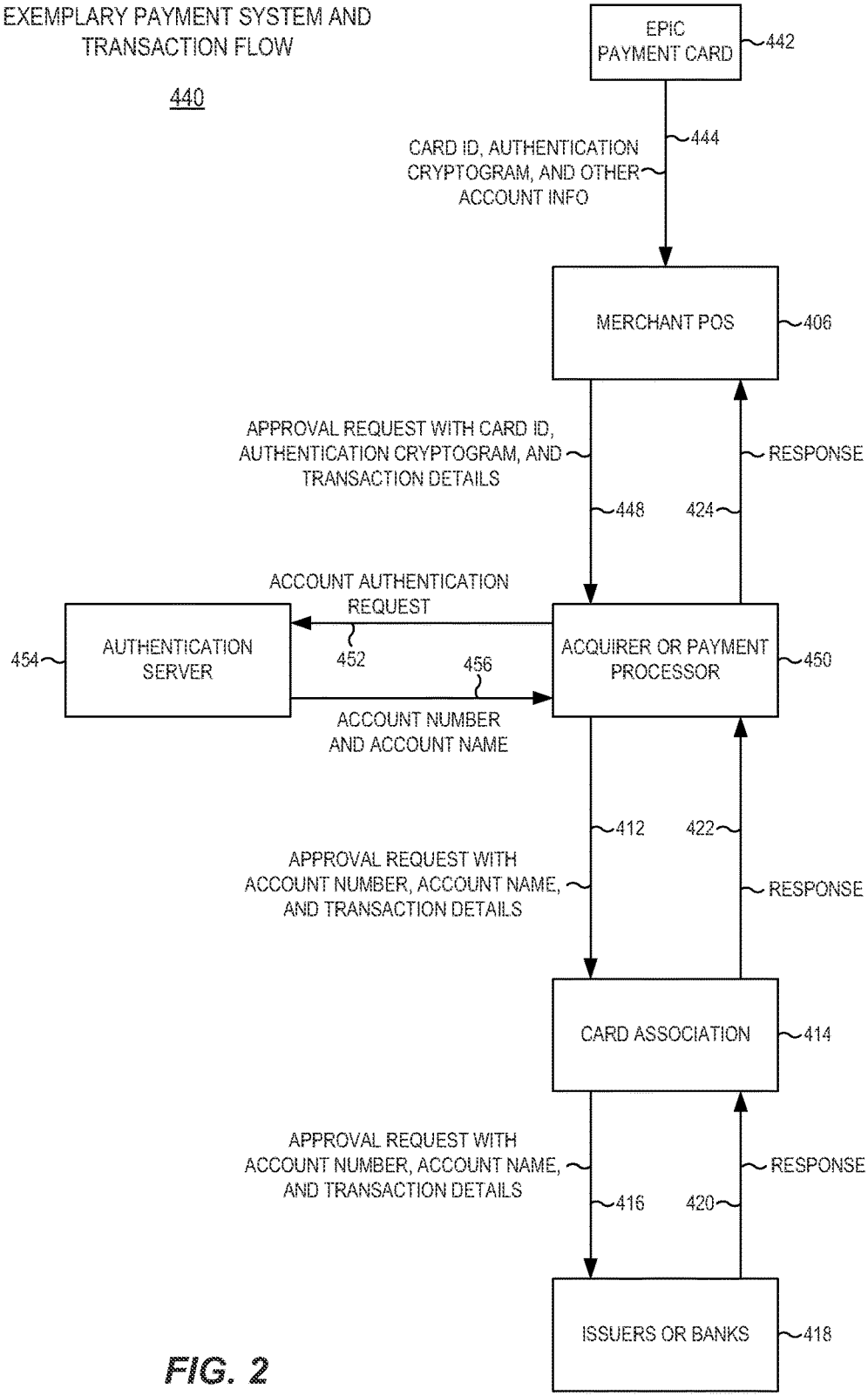
FIG. 2 is a block diagram depicting an exemplary payment system and transaction flow related to purchase transaction approval.

Referring now to FIG. 2, a block diagram is shown which depicts an exemplary EPIC payment system 440 and transaction flow. An exemplary EPIC payment card 442 includes a re-writable magnetic stripe on which the payment card identifying number is encoded in the account number field, the authorization cryptogram is encoded (for each attempted transaction) in the account name field, the payment card expiration date is encoded in the expiration date field, and other information, as described further herein, may also be encoded. In this example, the payment card identifying number represents an EPIC account which is not itself a live payment card account, but to which are linked one or more live payment card accounts.

At least some fields within the magnetic stripe, such as the account name field, may be re-writable, while other fields may be written during manufacture and are not re-writable, as described below. This account information 444 is communicated to the merchant 406 by swiping the payment card 442 through a magnetic card reader on a point-of-sale (POS) terminal (not shown). Since all the information is encoded using standard fields, a traditional POS terminal may be used without any required changes as a result of the encoding. The merchant 406 combines the account information 444 with transaction information, as before, and forms an approval request 448 which is communicated to an acquirer 450.

As before, the acquirer 450 analyzes the account number conveyed in the inbound approval request 448 to determine the appropriate card association or entity to next process the transaction approval request. In this case, the account number would be recognized as an EPIC account number (or at least the first portion of an EPIC account number). The acquirer 450 then combines the information provided in the approval request 448 with additional information identifying the acquirer 450, and forms an account authentication request 452 (also variously described at times as an "authentication request") which is communicated to an EPIC authentication server 454. The account authentication request 452 may include all or a portion of the information received in request 448, but includes at least the EPIC account number, the date and time of the transaction, and the authentication cryptogram.

The authentication server 454 determines whether the authentication cryptogram is valid for the transaction, and if so, provides to the acquirer 450 an actual payment card account number and account name to use for processing the transaction. The authentication server 454 accomplishes this by independently generating a "reference" authentication cryptogram based upon the seed value corresponding to the EPIC account number, and based upon the date/time of the transaction (or other temporal signal value, as described below). If the server-calculated reference authentication cryptogram matches the received authentication cryptogram generated by the EPIC card and provided to the merchant 406, then the authentication server 454 provides an actual payment card account number and account name to use for the transaction, and conveys this information in a response 456 communicated back to the acquirer 450.

When the account number of the payment card to be used for the transaction, and its corresponding account name, are received from the authentication server 454 via response 456, the acquirer 450 combines this information with other information provided in the approval request 448, and with additional information identifying the acquirer 450, and forms an appropriate approval request 412 which is communicated to the card association 414 corresponding to the actual payment card being used. This request 412 is essentially unchanged from that shown in FIG. 1, since at this point the EPIC account number and authentication cryptogram have been replaced with a "live" payment card account number and account name.

As before, the card association 414 combines the information provided in the approval request 412 with additional information identifying the card association 414, and forms an approval request 416 which is communicated to the issuer 418 of the payment card being used. The issuer 418 then processes the approval request to either approve or deny the particular transaction, and communicates a response 420 back to the card association 414. If the issuer authorizes the purchase, the response 420 will include a payment authorization number. The card association 414 similarly provides a response 422 back to the acquirer 450, who provides a corresponding response 424 back to the merchant 406 to indicate either approval or denial of the transaction.

Figure 3:
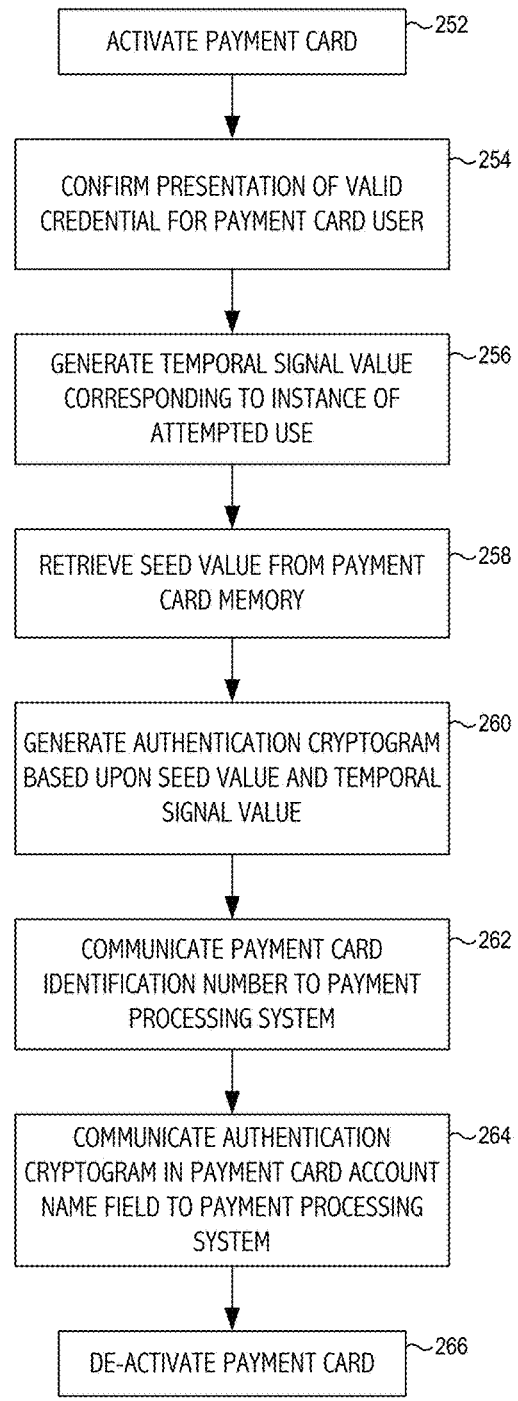
FIG. 3 is a flowchart depicting exemplary payment card internal operation.

Referring now to FIG. 3, a flow chart 250 is shown which depicts operation within an exemplary EPIC payment card. At step 252 the card is activated by the card user. This may correspond to powering up the card, such as by pressing a power switch on the face of the card, or by some other mechanism to power up or bring the card out of a standby condition. Activating the card may also be accomplished by "snapping" a card which includes a sensor capable of detecting such manipulation by the card user. Suitable snap sensors include the Snap Switch device from Cardlab ApS, located in Copenhagen, Denmark.

At step 254 the card confirms the presentation of a valid credential for the payment card user. In some embodiments, a payment card credential may be presented by a card user by swiping a fingerprint across a fingerprint sensor included within the card. In some embodiments, a payment card credential may be presented by entering a PIN number using a numeric keypad included within the card. These and other user credentials are described in greater detail below.

At step 256 a temporal signal value is generated which corresponds to the instance of attempted use. In some embodiments such a temporal signal value may reflect the date/time of the attempted use. The date and time may be determined by a real-time clock device included within the payment card, or may be communicated by the merchant POS terminal to the payment card, or by some other technique. In some embodiments such a temporal signal value may reflect the sequence value (or sequential number) of the attempted use. At step 258 the card retrieves a seed value from memory within the payment card. This seed value is unique for each payment card, and corresponds to the payment card identifying number. The seed value is preferably 1024 to 2048 bits in length, although other lengths, both shorter and longer, are contemplated. A unique seed value for each payment card may be achieved by using a sufficiently long pseudo-random bit string, such as a 1024-bit string. However, in certain embodiments, the seed value may include certain non-random customer specific information, such as a unique customer key, either alone or in addition to a pseudo-random bit string, to eliminate any possibility that more than one payment card could have the same seed value. Such a customer key may be stored within a much larger page of pseudo-random data to frustrate attempted hacking of the payment card. At step 260 the card generates an authentication cryptogram based at least upon the seed value and the temporal signal value. In certain preferred embodiments the authentication cryptogram is 20-26 characters in length, and is based upon the seed value corresponding to the payment card, and the date and time of the transaction. Nevertheless, authentication cryptograms having fewer than 20 characters are also contemplated.

At step 262 the card communicates the payment card identifying number to the payment system. In some embodiments this may be accomplished using a magnetic stripe on the payment card. In some embodiments this may also be accomplished using near field communication (NFC) using an appropriate transmitter or transceiver circuit. Moreover, acoustic techniques, such as ultrasonic communication (e.g., as described by Naratte, Inc. of San Jose, Calif.) may be used for such communication. At step 264 the card communicates the authentication cryptogram in a payment card account name field to the payment processing system. In some embodiments this may be accomplished by using a re-writable magnetic stripe, which is written with the authentication cryptogram in an account name field within the re-writable magnetic stripe. In such cases, the card user can swipe the card through a magnetic card reader of a POS terminal. Lastly, at step 266 the card is automatically deactivated after expiration of the validation window, which may include erasing the authentication cryptogram from the re-writable magnetic stripe on the card, and/or powering down the card to conserve battery life.

Figure 4:
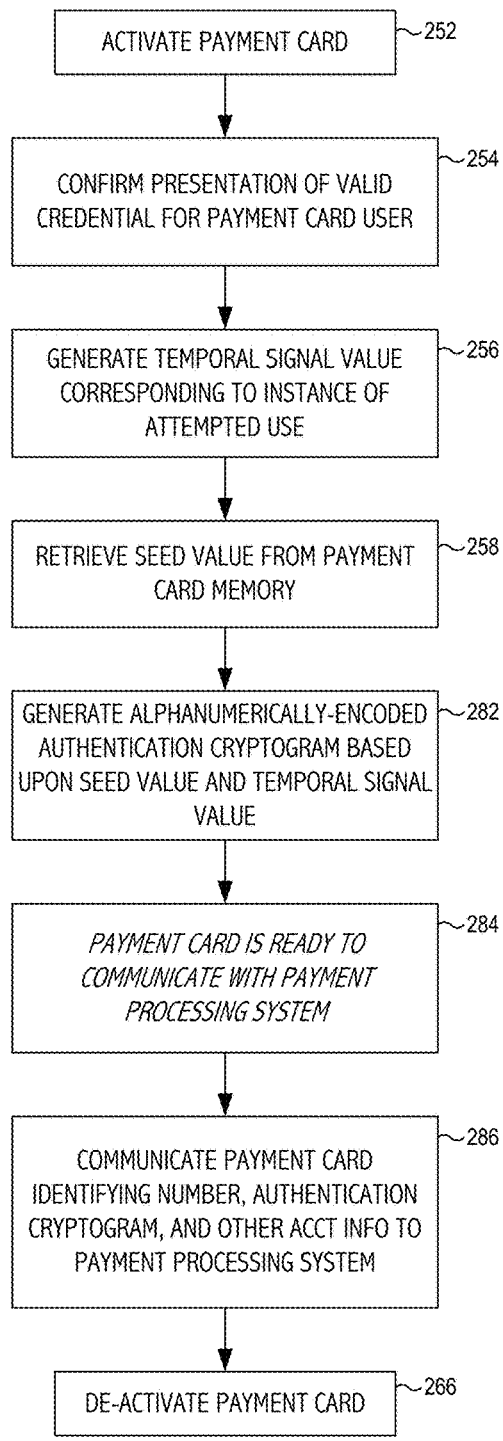
FIG. 4 is a flowchart depicting exemplary payment card internal operation.

Referring now to FIG. 4, a flow chart 280 is shown which depicts operation within another exemplary EPIC payment card. Steps 252 through 258 are as described above in regards to FIG. 3. At step 282 the card generates an alpha-numerically-encoded authentication cryptogram based at least upon the seed value and the temporal signal value. Exemplary methods and structures for accomplishing this step are described below.

At step 284 the card is considered ready to communicate with the payment processing system, and would be the case waiting for a card user to swipe the card through a magnetic card reader, or waiting for the card user to bring the payment card in proximity to a near field communication terminal. Then, at step 286, the card communicates the payment card identifying number, the authentication cryptogram, and other account information to the payment processing system. In some embodiments this may be accomplished using a magnetic stripe on the payment card. In some embodiments this may also be accomplished using near field communication using an appropriate transmitter or transceiver. At step 266 the card is automatically deactivated, as before.

Figure 5:
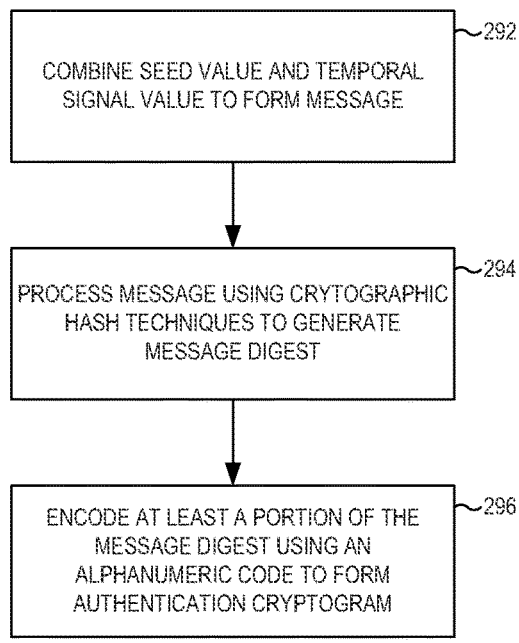
FIG. 5 is a flowchart depicting exemplary generation of an authentication cryptogram.

Referring now to FIG. 5, an exemplary implementation 290 is shown of step 282 for generating the authentication cryptogram. At step 292, the seed value and the temporal signal value are combined to form a "message." In certain embodiments the temporal signal value may represent the date/time of the attempted card use as obtained from a real time clock device within the payment card, as communicated from the POS terminal, as obtained by an RF communication link directly from a source providing a time reference signal, such as GPS satellite or network time reference, or by way of some other source of the date and time. In certain embodiments the temporal signal value may correspond to a unique number which is determined for each sequential attempted use of the card. For example, temporal signal value may increment for each attempted use, or may use an incrementing pointer to reference a table entry stored within the payment card memory.

At step 294 the message is processed, such as by using a cryptographic hash function, to generate a message "digest." A cryptographic hash function is typically viewed as a deterministic procedure that takes an arbitrary block of data, known as a "message," and returns a fixed-size string, known as a hash value or "message digest," such that any change to the message will change the message digest. Such functions are well known in the art, and include MD5, SHA-1, and SHA-2. For example, MD5 returns a 128-bit message digest, while SHA-1 returns a 160-bit digest.

At step 296, all or a portion of the message digest is encoded using an alpha-numeric code to form the authentication cryptogram. In certain embodiments, the alpha-numeric code utilizes at least 20 characters, each of which represents any of 10 possible values (i.e., having a radix equal to 10), so that the authentication cryptogram can represent any of least $10^{20}$ possible values, which is more than can be represented using 19 decimal digits. In certain embodiments, the alpha-numeric code utilizes at least 20 characters, each of which represents any of more than 10 possible values (i.e., having a radix greater than 10), so that the authentication cryptogram can represent any of at least $11^{20}$ possible values, which is far more than can be represented using 19 decimal digits. In certain embodiments, the alpha-numeric code utilizes at least 20 characters, each of which represents any of more than 16 possible values (i.e., having a radix greater than 16), so that the authentication cryptogram can represent any of least $17^{20}$ possible values, which is more than can be represented using 19 hexadecimal digits. In certain embodiments, the alpha-numeric code utilizes at least 20 characters, each of which represents any of at least 32 possible values (i.e., having a radix at least 32), so that the authentication cryptogram can represent any of least $32^{20}$ possible values. Preferably an alpha-numeric code using 32 characters is employed so that each character of the authentication cryptogram represents 5 bits of the digest (or portion thereof).

Figure 6:
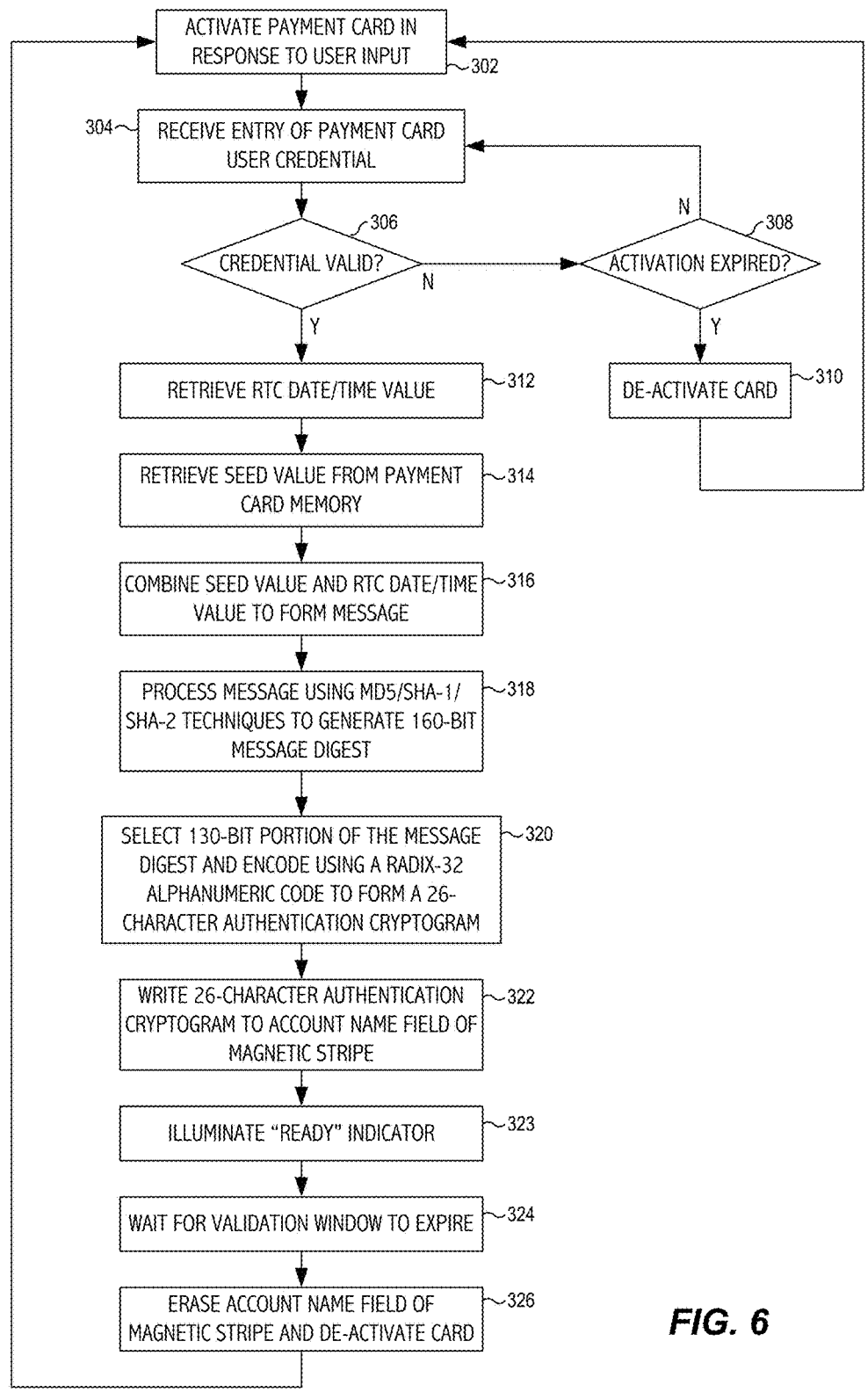
FIG. 6 is a flowchart depicting exemplary payment card internal operation.

FIG. 6 is a flowchart 300 depicting another exemplary EPIC payment card operation. At step 302 the card is activated in response to user input by the card user, such as pressing a power switch on the face of the card, or "snapping" the card. Activating the card may power-up the card from a virtually "off" condition, or may bring the card out of a standby condition. In some embodiments the card may stay powered-up, but activating the card at least enables the card to receive entry of a payment card user credential at step 304. In some embodiments, a payment card credential may be presented by a card user swiping a fingerprint across a fingerprint sensor included within the card. In some embodiments, a payment card credential may be presented by entering a PIN number using a numeric keypad included within the card. In some embodiments, a payment card credential may be presented by entering an RSA-generated key (e.g., a SecurID two-factor-authentication) using such a numeric keypad included within the card.

At step 306 the card compares the credential entered by the card user against a reference credential stored within the card. If the entered credential is valid, processing continues to step 312. Alternatively, if the entered credential is not valid, the card determines at step 308 whether the time limit for activation of the card has expired. If so, the card is deactivated at step 310 and control returns to step 302 to await a subsequent activation. If not expired, control returns to step 304 to allow the card user to enter a new user credential.

Upon receiving a valid user credential, the card at step 312 retrieves the current date and time value. This may be provided by a real-time clock circuit contained within the payment card. The current date and time value may also be communicated by the payment system network, such as by way of the POS terminal. This may also be communicated by way of an RF link to receive appropriate date/time signals from a time reference source, such as a GPS satellite, cell tower time reference source, atomic clock, etc.

At step 314 the card retrieves a seed value from memory within the payment card. A useful size (or length) of the seed value is 1 kB, although other lengths may be chosen, but the seed is preferably long enough to be extremely difficult for an unauthorized person to guess. At step 316 the seed value is combined with the RTC date/time value to form a block of data to be encrypted, called a "message." A useful size (or length) of the message is 1-2 kBytes, although other lengths may be chosen.

At step 318 the message is encrypted, preferably using a cryptographic hash function, other symmetrical encryption technique, or any useful encryption technique, to form a message digest. In this example, the card utilizes a SHA-1 algorithm to form a 160-bit long message digest. Many other algorithms may instead be used, such as SHA-2, MD5, and others.

At step 320 a 130-bit portion of the message digest is selected, and preferably encoded using a radix-32 alpha-numeric code to form a 26-character alpha-numeric authentication cryptogram, which at step 322 is written to the account name field on the magnetic stripe on the back of the payment card. Using a 26-character authentication cryptogram is particularly convenient since the account name field on a standard credit card transaction is 26-characters long. Using alpha-numeric encoding is also particularly convenient because the account name field is the only non-numeric field on a standard credit card. A 26-character radix-32 alpha-numeric encoded authentication cryptogram can thus be communicated using traditional POS terminal equipment and using traditional credit card field limitations, yet can communicate a 130-bit encrypted string. This is a much larger encrypted string than can be communicated using any of the traditional numeric fields, such as the 16-digit account number field, the 3-digit security code field, the 4-digit expiration date field, or even any of these numeric fields in combination.

At step 323 the card provides an indication that the entered user credential is valid and the authentication cryptogram has been generated and written to the magnetic stripe, and thus the payment card is ready for the user to swipe the card at a POS terminal. The card may provide this indication by any of several techniques, such as turning on a small light on the card, presenting an appropriate message on a display that is incorporated within the card, or by another readily-observable technique.

Step 324 provides a brief time delay for the card to remain validated to afford the card user time to swipe the card and initiate the transaction approval. After the validation window expires, at step 326 the card preferably erases (i.e., over-writes) the authentication cryptogram from the magnetic stripe, then de-activates the card.

Payment Cards

Figure 7:
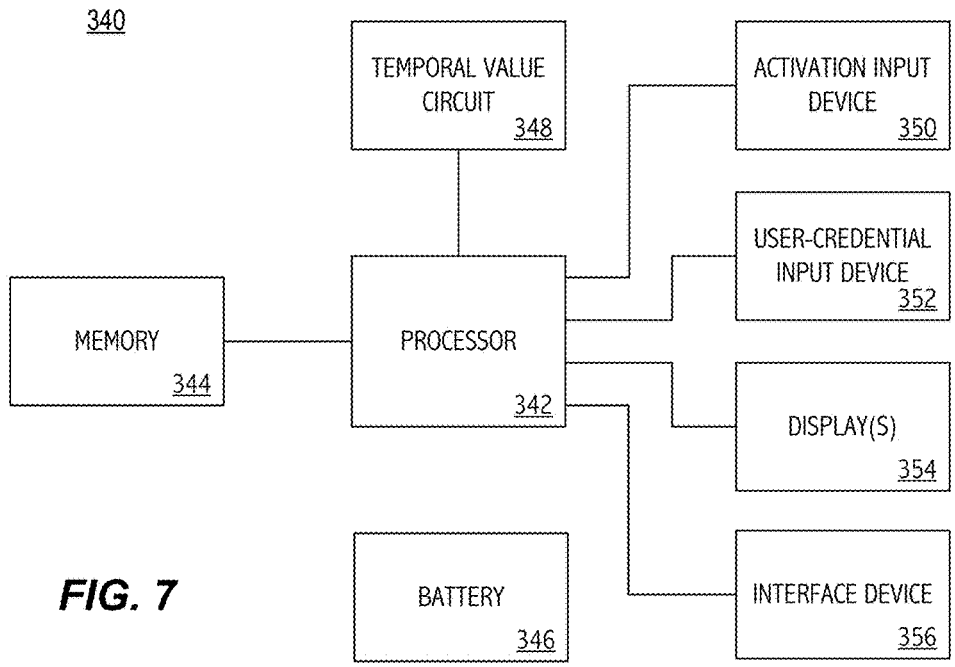
FIG. 7 is a block diagram depicting an exemplary payment card.

FIG. 7 is a block diagram depicting an exemplary EPIC payment card. The card 340 includes a processor 342 coupled to a memory 344, a temporal value circuit 348, an activation input device 350, a user-credential device 352, one or more displays 354, and an interface device 356. A battery 346 provides necessary power to the various components within the payment card. Exemplary physical implementations of various payment cards are depicted in several figures described below.

Such a processor may be a single integrated circuit or may include more than one IC operating together. The processor may include all or portions of a temporal value circuit (i.e., timing circuit), and a storage device (i.e., memory device). The processor may be configured to verify the credential for the payment card user, or a sub-circuit of the processor, or an entirely separate circuit may exist alongside a "commercial processor" circuit. Suitable commercially-available processors include the Smartcard microprocessor MF31CD8101 available from NXP, and the SecureCore SC000 RISC microprocessor available from ARM. For certain embodiments using near-field communications, useful NFC circuits for implementing a near-field communications transceiver include the PN544 NFC controller circuit available from NXP.

The temporal value circuit generates a temporal signal value that corresponds to the instance of attempted use. In some embodiments, the temporal value circuit may include a real-time clock circuit, and the temporal signal value may accordingly reflect the date/time of the attempted use. The date and time may be determined by a real-time clock device included within the payment card, or may be communicated by the merchant POS terminal to the payment card, or by some other technique. In some embodiments, the temporal value circuit may include a sequential instance circuit, and the temporal signal value may accordingly reflect the sequence value (or sequential number) of the attempted use. A series of consecutively generated sequence values need not be consecutive numbers, but may follow a prescribed non-consecutive pattern, or pseudo-random pattern, which corresponds to the particular EPIC payment card.

Figure 8:
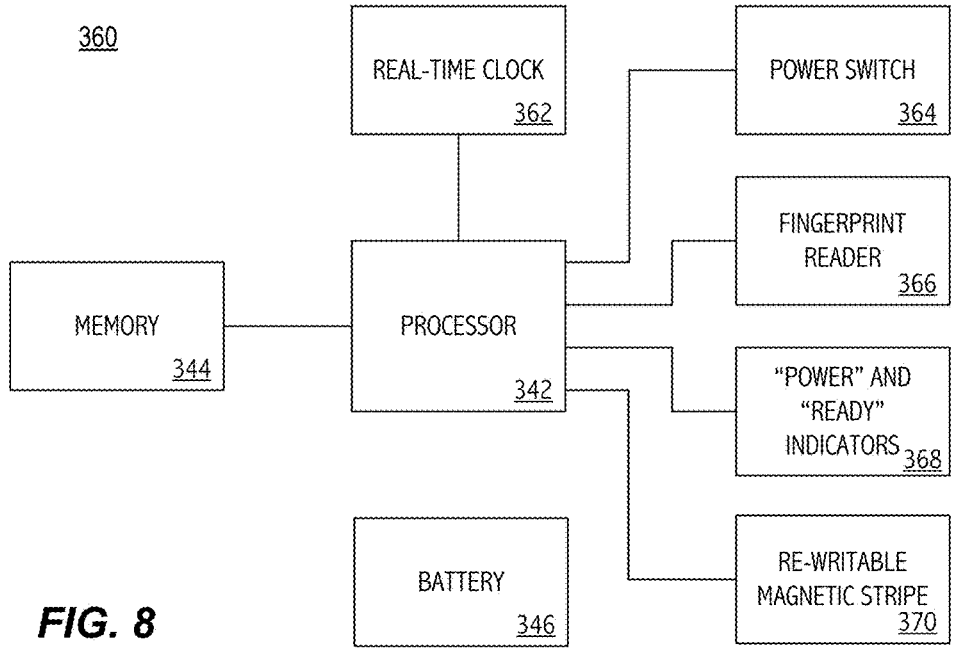
FIG. 8 is a block diagram depicting an exemplary payment card.

FIG. 8 is a block diagram depicting another exemplary EPIC payment card. The card 360 includes a battery 346, and a processor 342 coupled to a memory 344. The processor 342 is also coupled to a real-time clock circuit 362. Suitable real-time clock circuits are commercially available, including Smartcard RTC component model PCA8802, model PCF2123, and model PCF8564A, all of which are available from NXP. The processor 342 is also coupled to a power switch 364. The processor 342 is also coupled to a fingerprint reader 366, a pair of displays 368 to indicate "power" and "ready" states, and a re-writable magnetic stripe 370.

Figure 9:
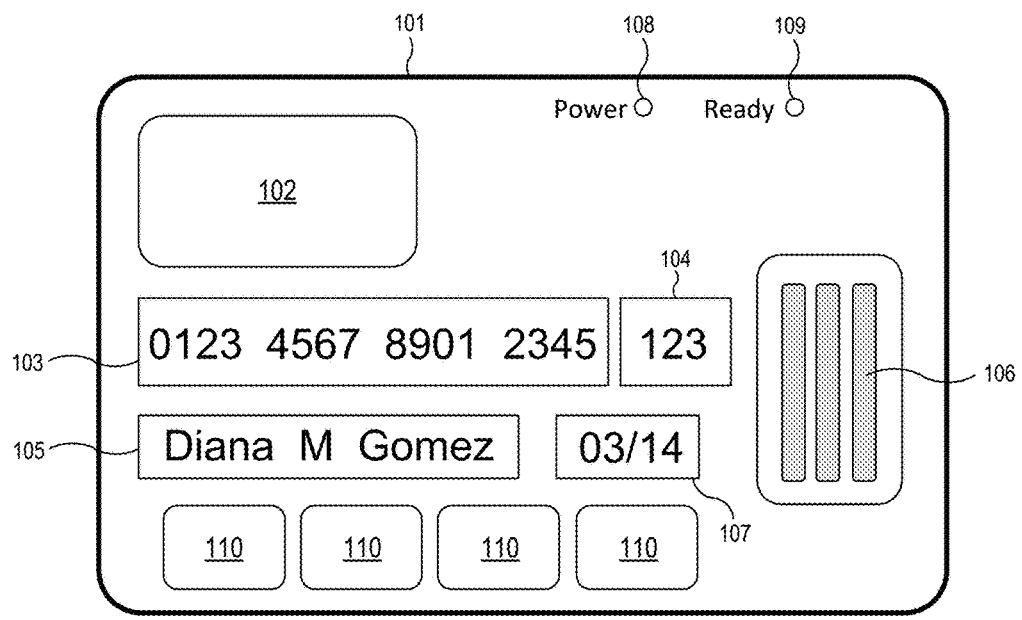
FIG. 9 depicts the front side arrangement of an exemplary payment card.

FIG. 9 depicts the front side of an exemplary EPIC payment card 101 consistent with the block diagram shown in FIG. 8. The card 101 includes a logo region 102 to provide space for a company logo, such as an EPIC logo, to be printed on the card. An account number region 103, a security code region 104, an account name region 105, and an expiration date region 107 provide space for the corresponding data values to be printed or embossed on the card 101, as with many traditional payment cards. The card 101 includes several endorsement logo regions 110 to provide space for endorsed major credit card company logos to be printed on the card. A fingerprint reader 106 serves as a user credential input device for this exemplary payment card 101. Suitable fingerprint reader modules are commercially available, including the Biometric Sensor, a low power fingerprint sensor device from Cardlab ApS, located in Copenhagen, Denmark. An exemplary fingerprint verification module is found in the BAL Authenticator Smart Card, available from Biometric Associates, LP, located in Bangor, Me.

The payment card 101 includes a "snap" membrane switch (not shown) so that a card user can activate the card by briskly snapping the card with a finger. Suitable snap sensors include the Snap Switch device from Cardlab ApS, located in Copenhagen, Denmark. A power indicator 108 is included to provide a visual indication to a card user that the card has been successfully activated. Such a power indicator 108 may be advantageously labeled "power" or "active" or "enter credential" or any of a number of appropriate descriptive words or phrases to indicate that the card is active and ready for the card user to enter the user credential. Exemplary light sources may be found on the MultiAccount credit card device available from Dynamics, Inc., located in Pittsburgh, Pa.

Figure 10:
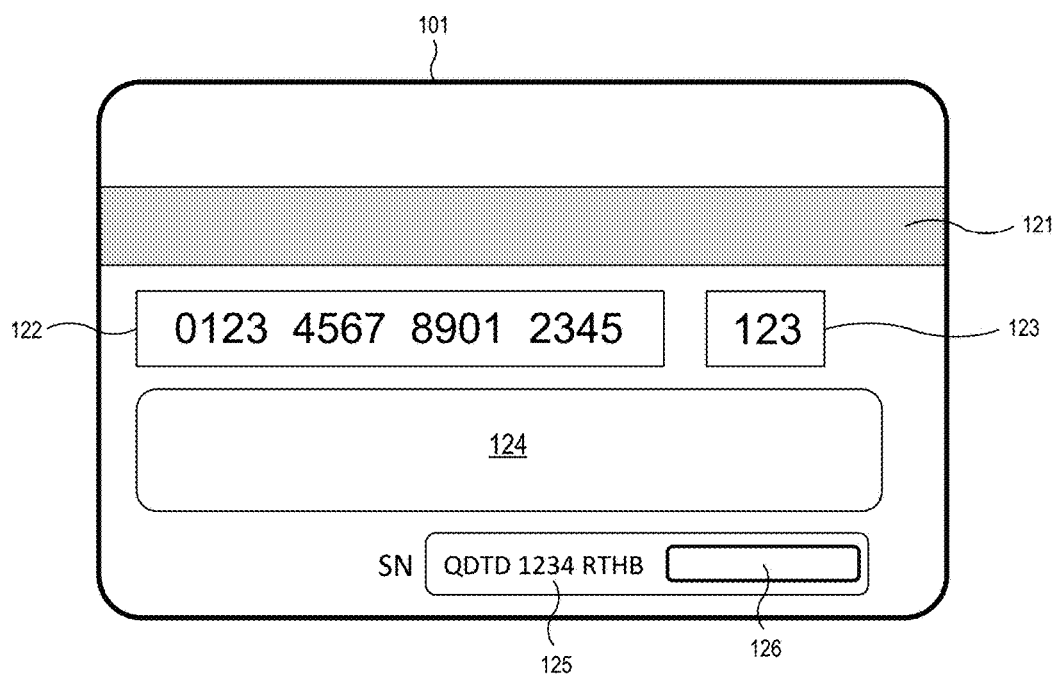
FIG. 10 depicts the back side arrangement of an exemplary payment card.

A ready indicator 109 is included to provide a visual indication to a card user that the user credential has been successfully validated, and that the authentication cryptogram has been generated and written to a re-writable magnetic stripe 121 on the back side of the payment card 101 as shown in FIG. 10. Such a ready indicator 109 may be advantageously labeled "ready" or "SAC" or "ready to swipe" or any of a number of appropriate descriptive words or phrases to indicate that the card is ready for the card user to swipe the card.

FIG. 10 depicts the back side of exemplary payment card 101, which includes an account number region 122 and security code region 123 to provide space for the corresponding values to be printed. A general information region 124 provides space for information such as customer support telephone numbers, email address, web address, etc. A re-writable magnetic stripe 121 serves as an interface device to the payment system. Such a re-writable magnetic stripe 121 may be implemented as a magnetic stripe emulator or as an actual re-writable magnetic stripe. The magnetic stripe on a traditional credit card has 3 tracks, each for encoding certain information according to a specific format. On card 101 the re-writable magnetic stripe 121 may be entirely re-writable so that all information on any of the three tracks may be written by the card itself, or may be partially re-writable so that all or a portion of the information on only one track may be written by the card itself. Here the re-writable magnetic stripe 121 is capable of at least writing the account name field encoded on the magnetic stripe, so that the authentication cryptogram, which is generated for each attempted transaction, may be written to the account name field and communicated to the payment processing system. Suitable re-writable magnetic stripe devices are commercially available, including the including the Dynamic Magnetic Stripe device from Cardlab ApS, of Copenhagen, Denmark. This device is a full length dynamic magnetic stripe which provides track 1 and 2 emulation of a real magnetic stripe.

A serial number region 125 provides space to include a serial number printed on the card. This is particularly useful since the card memory contains information which is not discernable from the front or back face of the card. For example, the seed value that is stored securely within the memory of a given payment card is associated with a particular payment card account. However, if that given payment card is lost, stolen, damaged, or otherwise compromised, a replacement card associated with that particular payment card account may contain a different seed value than the seed value in the compromised card. A serial number allows these two cards to be distinguished without compromising the security of the payment card. A bar code region 126 provides space for a printed bar code representing the serial number. The arrangement of features shown on the back side of card 101 may also be appropriate for other payment cards having a different front-side arrangement.

Figure 11:
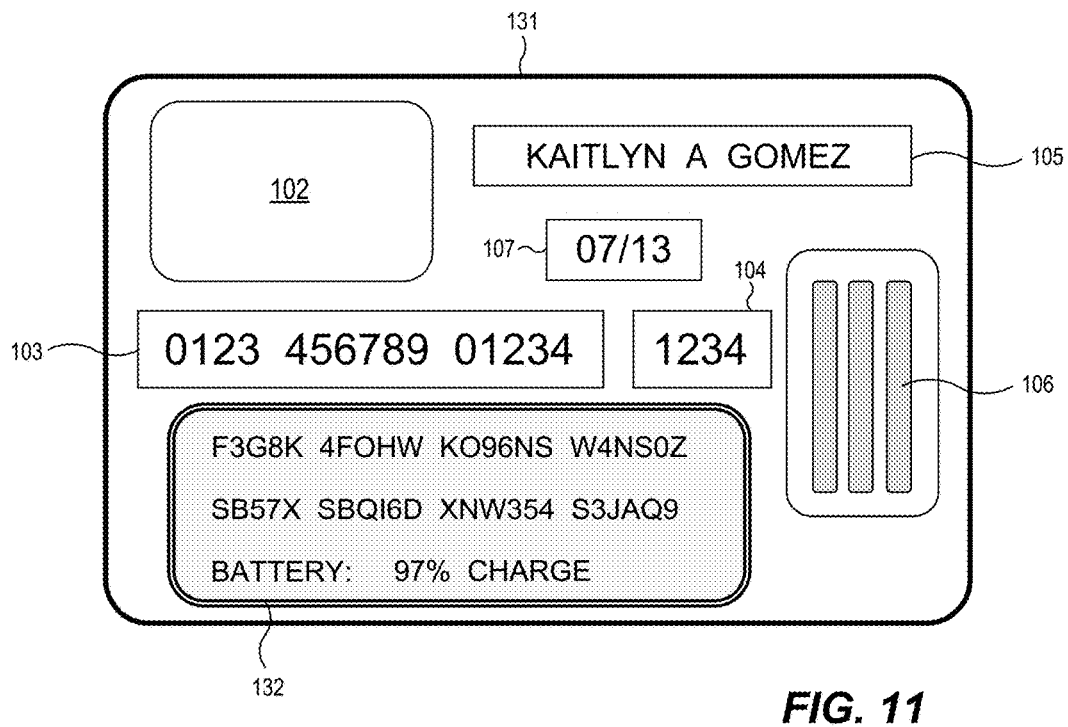
FIG. 11 depicts the front side arrangement of another exemplary payment card.

FIG. 11 depicts the front side of an exemplary payment card 131, which includes a logo region 102, and account number region 103, a security code region 104, an account name region 105, an expiration date region 107, and a fingerprint reader 106, all as described above. The payment card 131 also includes a "snap" membrane switch (not shown) so that a card user can activate the card by briskly snapping the card with a finger, as described above.

The card 131 includes a display 132 which, in this example, is a 24-character by 5-line alpha-numeric display. Suitable alpha-numeric displays are commercially available, including the Electronic Paper Display model 520-1373 (which is an 8-character, 7-segment per character display), and the model 520-1365 (which is a 6-character, 7-segment per character display), available from E-Ink for smart cards, and each of which may be cascaded to provide several rows of information and/or additional characters per row of information. A variety of information may be presented on display 132, including an indication that the card is activated, and an indication that the card is ready to be used to initiate a transaction. In such a case, the exemplary card 131 need not include a separate power indicator 108, or a separate ready indicator 109, as was shown above.

If the display 132 is sufficiently large, a great variety of useful information may be displayed, including barcodes, telephone numbers, secure messages, alarms, and other notifications. For example, the battery life may be displayed whenever the card is activated. As another example, the generated authentication cryptogram may be displayed, which may be beneficial in facilitating an online transaction, as is described in greater detail below.

Figure 12:
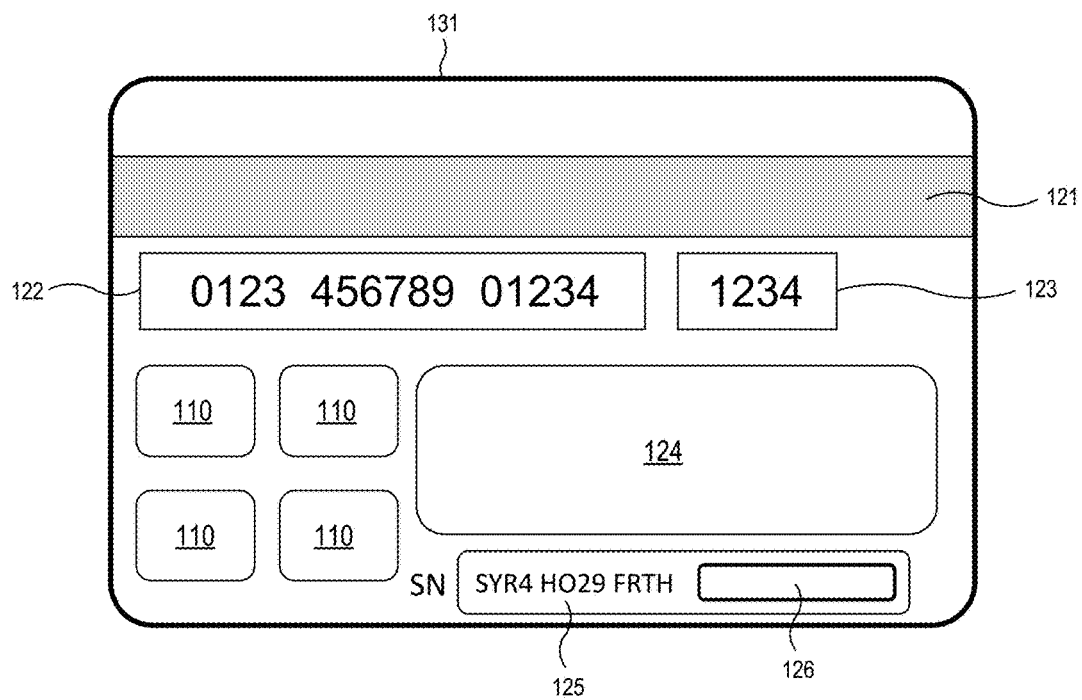
FIG. 12 depicts the back side arrangement of another exemplary payment card.

FIG. 12 depicts the back side of exemplary payment card 131, which includes a re-writable magnetic stripe 121, an account number region 122, a security code region 123, a general information region 124, several endorsement logo regions 110, a serial number region 125, and a bar code region 126, all as described above. The arrangement of features shown on the back side of card 131 may also be appropriate for other payment cards having a different front-side arrangement.

Figure 13:
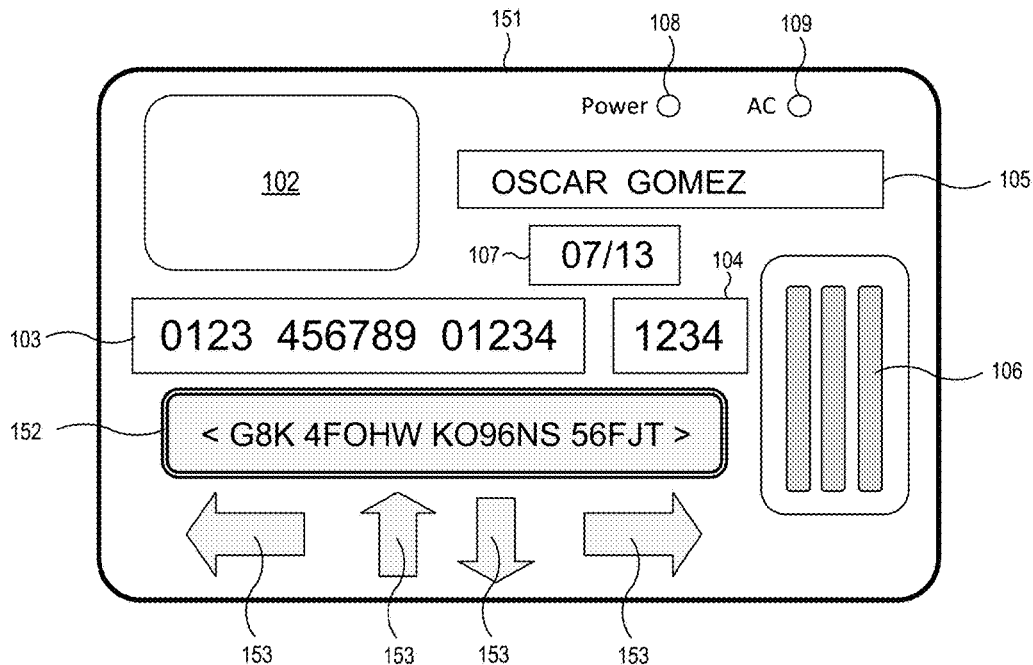
FIG. 13 depicts the front side arrangement of yet another exemplary payment card.

FIG. 13 depicts the front side of yet another exemplary EPIC payment card 151, which includes a logo region 102, and account number region 103, a security code region 104, an account name region 105, an expiration date region 107, a fingerprint reader 106, a power indicator 108, and a ready indicator 109 (here labeled "AC"), all as described above. The payment card 131 also includes a "snap" membrane switch (not shown) as described above.

The card 151 includes a display 152 which, in this example, is a 19-character single-line alpha-numeric display. A variety of information may be presented on display 132, including barcodes, telephone numbers, secure messages, alarms, and other notifications, as well as the generated authentication cryptogram. The card 151 also includes four scroll buttons 153 that may be used to scroll the display up, down, left, and right to view much more information than the number of characters that can be displayed at a time. Suitable buttons may utilize commercially available membrane switches, including membrane switches from Nelson Nameplate of Los Angeles, Calif.

Figure 14:
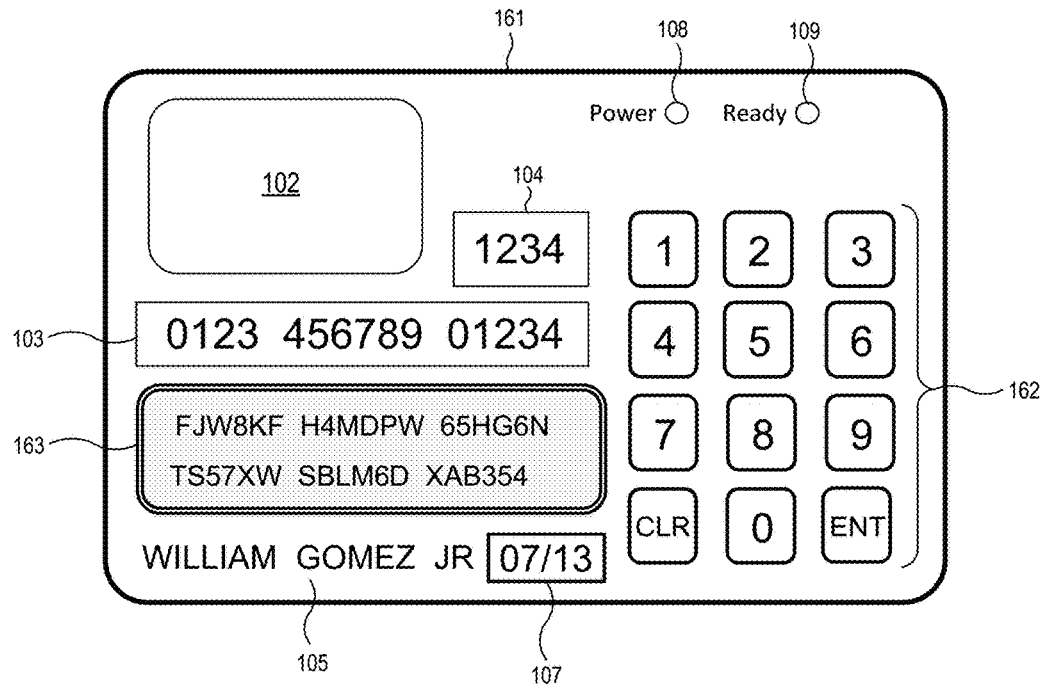
FIG. 14 depicts the front side arrangement of a still another exemplary payment card.

FIG. 14 depicts the front side of still yet another exemplary EPIC payment card 161, which includes a logo region 102, and account number region 103, a security code region 104, an account name region 105, an expiration date region 107, all as described above, as well as a display 163 which, in this example, is a 18-character by 2-line alpha-numeric display. An input keypad 162 provides a mechanism for entering a user credential such as a personal identification number (PIN). The keypad 162 can also be used to activate the card, such as by pressing any key, or simultaneously pressing two keys.

As the various exemplary payment cards described above illustrate, the techniques described herein may be realized using a payment card that is compatible with major credit card specification standards and therefore would be usable at any location where major credit cards are accepted. A fully static (16-digit) account number and (3-digit) security code are preferably utilized, which may be printed or embossed on the payment card. In some embodiments, a 16-digit payment card identifying number may be represented by the 16-digit account number field (which may be embossed or printed in account number region 103 and/or printed in account number region 122). In some embodiments, a 19-digit payment card identifying number may be represented by the 16-digit account number field along with the 3-digit security code field (which may be embossed or printed in security code region 103 and/or printed in security code region 123). In some embodiments the expiration date field may also be used to represent a portion of the payment card identifying number. Even though the payment card identifying number would be visible to merchant employees and left behind after a transaction, such information would be useless for an unauthorized person to make a fraudulent subsequent transaction. The account number field, the security code field, and the expiration date field are all usually encoded on track 1 of the magnetic stripe.

Transactions are secured by an authentication cryptogram that is generated for each attempted use, and is preferably communicated in the account name field (i.e., of a magnetic stripe on the card, in a NFC transmission, using an online web page, etc.) instead of the cardholder's actual name. The authentication cryptogram is also preferably encoded using an alpha-numeric code, which may be communicated in the account name field of a traditional payment card system since that field allows alphabetic characters. The account name field is usually encoded on track 1 of the magnetic stripe.

The basic equipment used by merchants will scan the account name field, security code field, and account name field in the usual manner (along with other information), and will communicate such information to the acquirer or payment processor, even though the account name field does not represent the actual account name of a payment card account holder.

When processing an authentication request, it is desirable that the authentication server knows the precise date/time used by a payment card to generate the authentication cryptogram communicated with the transaction approval request. If known, the authentication server can unambiguously generate a reference authentication cryptogram using the same date/time. To provide for communicating this date/time stamp, a payment card may encode the date/time stamp in a field preferably on track 2 of the magnetic stripe. Other embodiments, however, are contemplated in which the transaction date and time is not available or otherwise not provided. For example, an RSA key generated value may be used instead of the transaction date and time, as this credential is updated approximately every minute, and thus provides an appropriate temporal signal value.

Authentication Cryptogram

The security of this payment system derives from using a very secure authentication cryptogram technique which cannot be compromised. Irrespective of the specific encryption technique which may be employed, it is more secure to convey a longer encrypted string (i.e., a "cipher text") than a shorter one. In embodiments using the secure hash algorithm SHA-1, the message digest calculated by this algorithm is 160 bits long, irrespective of the length of the message itself. It would be very desirable to communicate the entire 160-bit message digest in a transaction approval request. However, none of the available data fields in a traditional payment card contain enough characters to send the whole message digest.

For example, if a 160-bit message digest must be represented using a decimal numbering system (i.e., using only the ten numeric digits 0-9), it would require a 49-character data field to send the entire message digest. If one tried to use the account number and security code data fields in combination, only 19 digits would be available, and only 38.77% of the 49-digit message digest could be communicated. However, by using the account name field to communicate the message digest, significantly more of the digest can be communicated because the account name field is the only field that allows alpha-numeric characters (instead of just numeric characters), and the account name field provides for up to 26 characters (instead of just 19 characters for the credit card number+security code fields).

A binary numbering system would require a data field that is 160 characters long to convey an entire SHA-1 generated 160-bit message digest. A decimal numbering system would require a data field that is 49 characters long to convey the whole 160-bit message digest. With a hexadecimal numbering system, the letters A thru F usually represent the decimal numbers 10 thru 15, which permits each symbol or character to represent 4-bits of information. Thus, a hexadecimal numbering system would require a data field that is 40 characters long to convey the whole 160-bit message digest. However, in a radix-32 numbering system, each symbol or character can represent 5-bits of information. For example, the letters A thru V can be employed to represent the decimal numbers 10 thru 31, and the digits 0-9 can represent the decimal numbers 0-9. Thus, a radix-32 numbering system would require a data field that is only 32 characters long to convey the whole 160-bit message digest. By using the account name field, one can communicate 26 characters, or 81.25% of the entire the message digest, which is tremendously more secure than communicating only 38.77% of the digest as with a 19-digit combined numeric field.

Many different symmetric cryptographic functions may be employed to generate the message digest. For example, the MD5 algorithm generates a 128-bit message digest, which can be transmitted in its entirety using a 26-character alpha-numeric account name field. Other suitable choices include the SHA-2 algorithms (SHA-224, SHA-256, SHA-384, SHA-512) which provide 224, 256, 384, or 512 bits, the Triple Data Encryption Standard (3DES) which provides 168 bits, the Advanced Encryption Standard (AES) which provides 128, 192, or 256 bits, the Data Encryption Standard (DES) which provides 56 bits, and numerous others.

The "radix" or "base" of a positional numbering system is the number of unique digits, characters, or symbols that the positional numbering system uses to represent numbers. For example, most commerce throughout the world is conducted using a decimal system (base-10 or radix-10 system) which utilizes the ten digits 0-9. The octal numbering system (radix-8) uses eight digits 0-7. The hexadecimal system (radix-16) uses 16 characters, usually 0-9 and A-F. A radix-32 numbering system uses 32 characters or symbols. One suitable radix-32 system uses the ten numeric digits 0-9 to represent the decimal numbers 0-9 (binary numbers 00000 through 01001), and uses the letters A-V to represent the decimal numbers 10-31 (binary numbers 01010 through 11111) although, as described further below, other mappings are possible. Other number systems having a higher radix are also useful in some embodiments. For example, all 26 letters of the alphabet and the 10 digits may be used in a radix-36 system. In such a system, a 26-character name field could represent an even greater portion of a 160-bit message digest. In addition, a radix-64 numbering system may utilize upper case letters A-Z, lower case letters a-z, digits 0-9, and two more characters (e.g., "+" and "/") so that each character can represent 6 bits of a message digest.

As used herein, a "character" can include a letter, number, and/or symbol. An "alpha-numeric code" could include alpha characters only (e.g., a hexadecimal code using letters A through P, but no numbers). An alpha-numeric code could include non-letter and non-number characters, such as special punctuation characters or symbols. Such a code could be useful in a NFC environment, even though not currently compatible with traditional magnetic stripe payment card field definitions.

Referring now to FIG. 15, a table is shown which describes several useful radix-32 number systems for representing binary numbers 00000-11111 and which "map" each of the 32 possible combinations of 5 bits (shown in column 601) into a unique alpha-numeric character. Each of the 32 possible combinations of 5 binary digits ("bits") is shown in column 601, along with the corresponding decimal representation (shown in column 602) and hexadecimal representation (shown in column 603). The "Map 1" system (shown in column 604) uses the ten numeric digits 0-9 to represent the binary numbers 00000-01001, and uses the letters A-V to represent the binary numbers 01010-11111. The characters W, X, Y, Z are not used in this mapping.

The "Map 2" system (shown in column 605) uses the same 32 characters, but in the reverse order, so that the letters V-A represent the binary numbers 00000-10101, and the digits 9-0 represent the binary numbers 10110-11111. The "Map 3" system (shown in column 606) is similar to the Map 1 column, but is shifted by one symbol so that the digits 1-9 represent the binary numbers 00000-01000 while the letters A-W represent the binary numbers 01001-11111. The characters 0, X, Y, Z are not used in this mapping.

Other mappings are shown in remaining columns of this table. Most of these exemplary mappings, after omitting 4 of the 36 available letters and numbers, assign the remaining 32 letters and numbers in some recognizable semblance of their usual order, although shifted by some number of positions, and perhaps in reverse order. However, such is not required, as illustrated by Map 13 (shown in column 607) which omits characters M, 7, 8, 9 and assigns the remaining characters in a totally random order.

While thirteen different mappings are shown in FIG. 15, there are actually $36^{26}$ (i.e., 36 to the power of 26) possible mapping schemes that may be employed using this group of possible characters. That is equivalent to $2.9 \times 10^{40}$ different mappings, which is more than one mapping for each human being on the planet, without repeating the mapping system even once. Consequently, each payment card may be configured to use not only a unique seed value (which may be 1 kB in length or longer) for internally generating the message digest for each attempted transaction, but can also be configured to use a unique mapping system to generate the corresponding authentication cryptogram.

Generalizing this mapping concept somewhat, such an alpha-numeric code may be described as utilizing an ordered set of M characters taken from a group of L characters (which could be a subset of letters and/or numbers and/or other symbols), where each character corresponds to a respective unique bit-encoding, and where the authentication cryptogram is at least N characters in length and can therefore take on any of $M^N$ possible values. In some embodiments, M is an integer greater than 10, L is an integer greater than M, and N is an integer greater than 20. In some preferred embodiments, M is equal to 32, L is an integer greater than (or equal to) M, and N is equal to 26.

The ordered set of M characters which makes up the alpha-numeric code for a given payment card may be chosen from a number $_LP_M$ of possible ordered sets. As is usual in the mathematical field of combinations and permutations, an expression of the form $_nP_r$ represents n!/(n−r)! and the symbol "!" represents the factorial operator. Other payment cards may choose a different ordered set of M characters. A particular alpha-numeric authentication cryptogram can represent any of a number $_LP_M$ of unique binary values, where each possible binary value corresponds to a respective one of a number $_LP_M$ of possible ordered sets. For example, if an ordered set of 32 characters is chosen from the 36 traditional letters and numbers, a particular alpha-numeric authentication cryptogram value can represent any of (36!/4!) possible binary values.

In some embodiments, each payment card may utilize a unique, static seed value for that card, and all payment cards may utilize the same static mapping system. In some embodiments, each payment card may utilize a unique, static seed value for that card, and each payment card may utilize a unique, static mapping system for that card, to provide an authentication cryptogram that is even more difficult to crack within any reasonable timeframe.

Non-static assignments of the seed value and the mapping system are also contemplated. For example, each payment card may utilize a unique sequence of seed values for that card that change for each transaction, or after a certain number of transactions. As another example, each payment card may utilize a unique sequence of mapping systems for that card that change for each transaction, or after a certain number of transactions.

Other Payment Processing System Configurations

The exemplary payment system 440 and transaction flow as shown in FIG. 2 introduces a secure payment card processing system which utilizes an authentication cryptogram to provide a fraud-proof payment system. Many other payment processing system configurations are contemplated, several of which will be described using the following several figures, in which the differences over FIG. 2 are highlighted.

Figure 16:
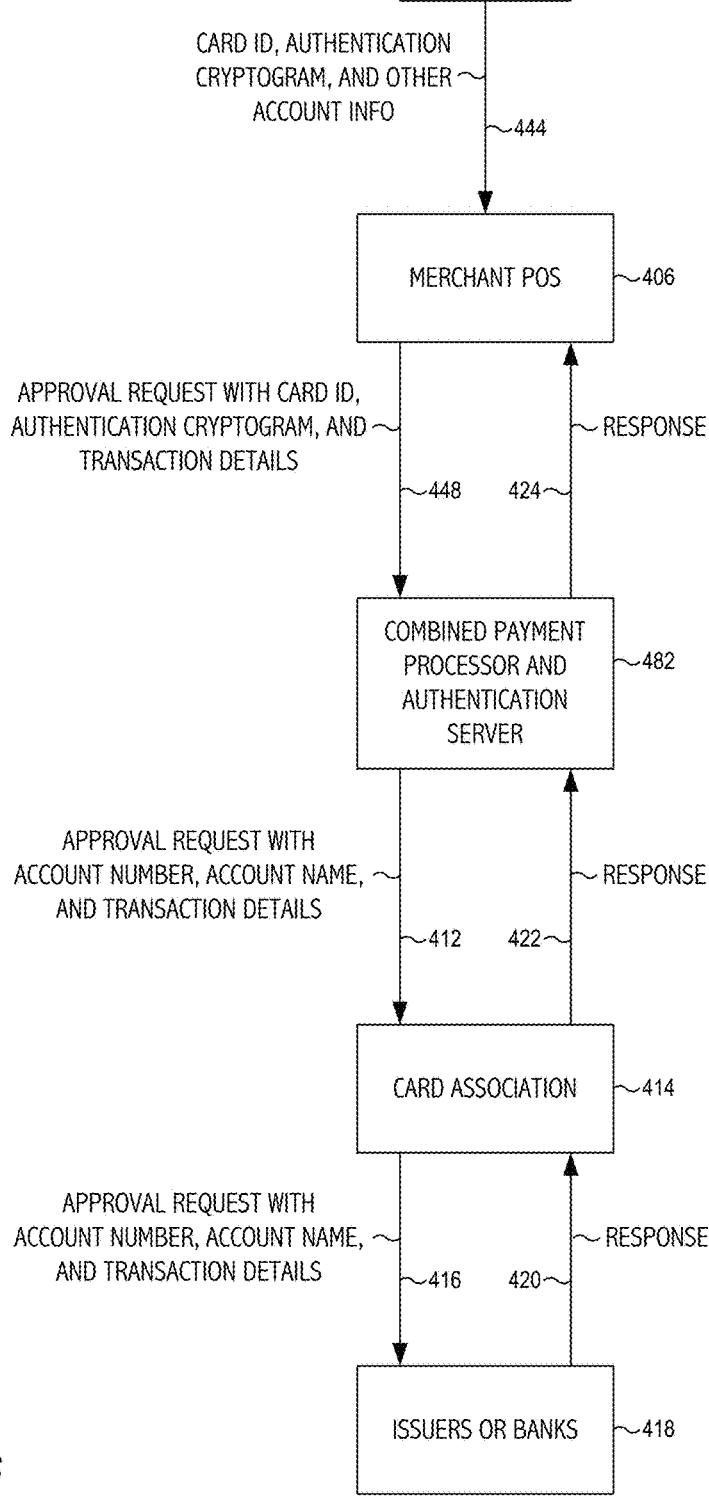
FIG. 16 is a block diagram depicting an exemplary payment system and transaction flow related to purchase transaction approval.

Referring now to FIG. 16, a block diagram is shown which depicts another exemplary EPIC payment system 480 and transaction flow. This system incorporates an acquirer 482 that functions as both a payment processor (i.e., for traditional payment card accounts) as well as an authentication server for EPIC card accounts. The acquirer 482 analyzes the account number conveyed in the inbound approval request 448 to determine the appropriate card association or entity to next process the transaction approval request. If the approval request from a merchant conveys a traditional card account such as VISA account or MasterCard account, the acquirer 482 then combines the information provided in such an approval request with additional information identifying the acquirer 482, and forms an approval request 412 which is communicated to a card association 414 corresponding to the payment card being used.

In this case, the account number conveyed by the approval request 448 would be recognized as an EPIC account number (or at least the first portion of an EPIC account number). The acquirer 482 then processes an account authentication request which includes at least the EPIC account number and the authentication cryptogram. As with a stand-alone authentication server 454 described in FIG. 2, the combined acquirer/authentication server 482 determines whether the authentication cryptogram is valid for the transaction, and if so, determines an actual payment card account number and actual account name for processing the transaction. The acquirer 482 then analyzes this actual account number to determine the appropriate card association or entity to next process the transaction approval request, and forms an approval request 412 which is communicated to a card association 414 corresponding to the actual payment card being used. The approval request 412 communicated to the card association 414 and the approval request 416 communicated to the issuer 418, as well as the response 420 communicated to the card association 414, the response 422 communicated to the acquirer 482, and the response 424 communicated to the merchant 406, are substantially analogous to those described in reference to FIG. 1 and FIG. 2.

Figure 17:
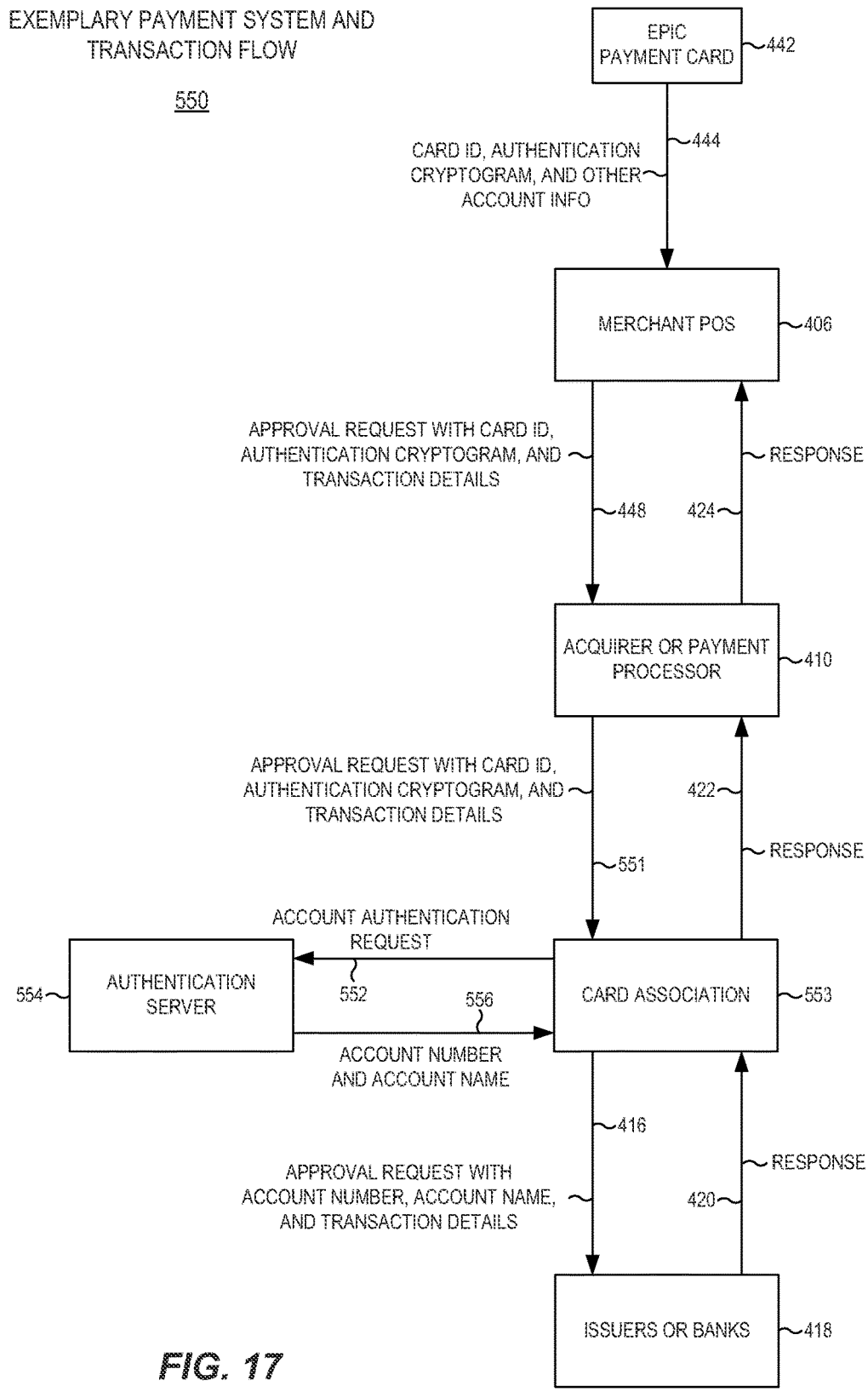
FIG. 17 is a block diagram depicting an exemplary payment system and transaction flow related to purchase transaction approval.

FIG. 17 is a block diagram depicting another exemplary EPIC payment system 550 and transaction flow. This payment system 550 includes an authentication server 554 coupled to a specific card association 553, and is useful for the card association 553 to provide secure authentication for the payment card accounts of its various issuers. Differences over the system described in reference to FIG. 2 will be highlighted below.

The acquirer 410 analyzes the account number conveyed in the inbound approval request 448 to determine the appropriate card association or entity to next process the transaction approval request. In this case, the account number would be recognized as an EPIC account number (or at least the first portion of an EPIC account number). The acquirer 410 then combines the information provided in the approval request 448 with additional information identifying the acquirer 410, and forms an approval request 551 which is communicated to the card association 553.

The card association 553 then forms an account authentication request 552 which is communicated to an EPIC authentication server 554. The account authentication request 552 may include all or a portion of the information received in request 448, but includes at least the payment card identifying number and the authentication cryptogram.

The authentication server 554 determines whether the authentication cryptogram is valid for the transaction, and if so, provides to the card association 553 an actual payment card account number and account name to use for processing the transaction, which is conveyed in a response 556 communicated back to the card association 553.

The card association combines this information with other information provided in the approval request 551, and with additional information identifying the card association 553, and forms an appropriate approval request 416 which is communicated to the card issuer 418 corresponding to the payment card being used. This request 416 is essentially unchanged from that shown in FIG. 1, since at this point the EPIC card number (or other payment card identifying number) and authentication cryptogram have been replaced with a "live" payment card account number and account name.

The issuer 418 then processes the approval request to either approve or deny the particular transaction, and communicates a response 420 back to the card association 553. The card association 553 similarly provides a response 422 back to the acquirer 410, who provides a corresponding response 424 back to the merchant 406 to indicate either approval or denial of the transaction.

Figure 18:
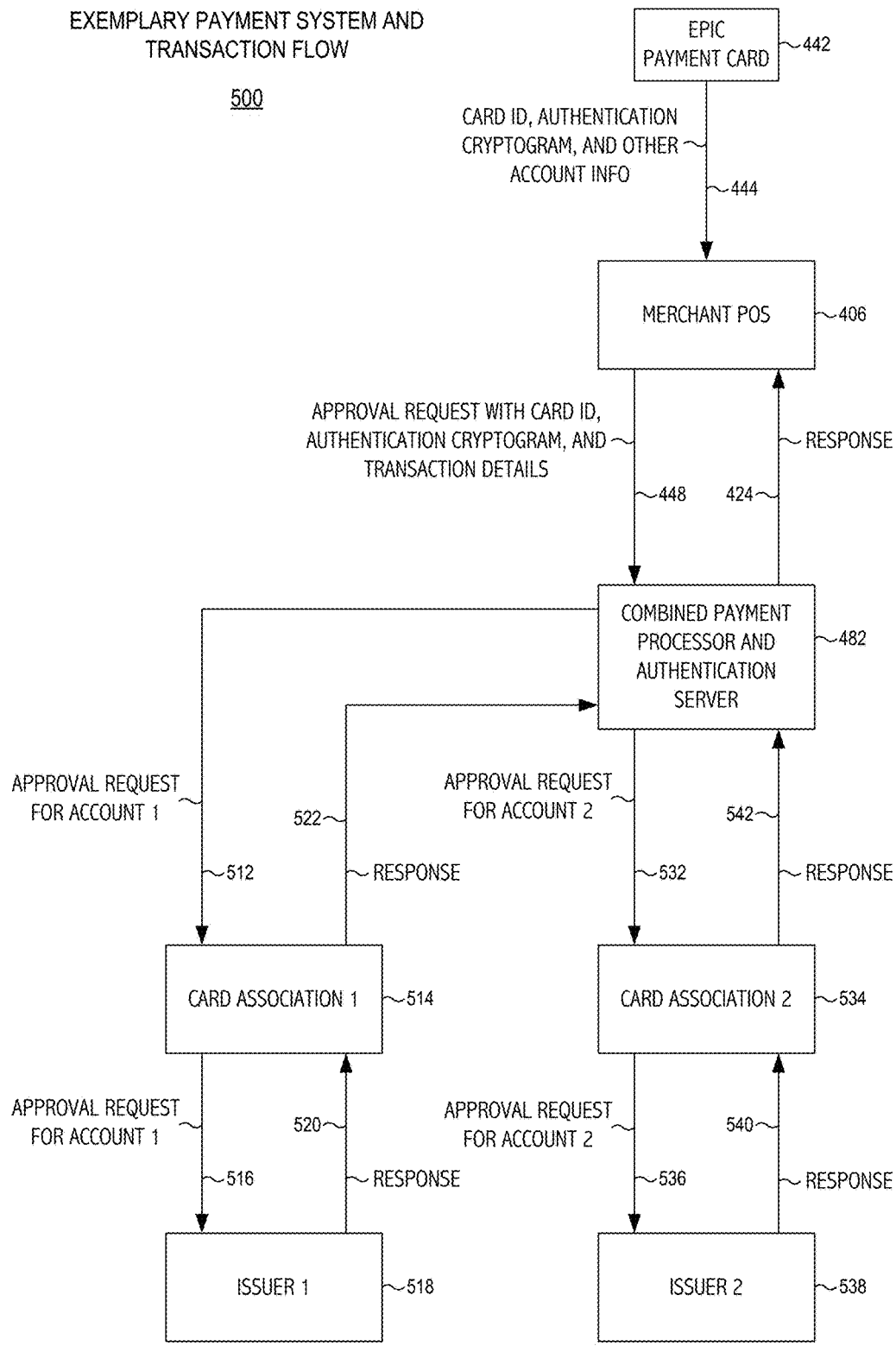
FIG. 18 is a block diagram depicting an exemplary payment system and transaction flow related to purchase transaction approval involving more than one payment card account.

FIG. 18 is a block diagram depicting an exemplary EPIC payment system 500, which illustrates purchase transaction approval in a situation when two (or more) "live" payment card accounts are linked to an EPIC account. As in FIG. 16, here an acquirer 482 functions as both a payment processor (i.e., for traditional payment card accounts) as well as an authentication server for EPIC card accounts.

The acquirer 482 analyzes the account number conveyed in the inbound approval request 448 to determine the appropriate card association or entity to next process the transaction approval request. In this case, the account number would be recognized as an EPIC account number. The acquirer 482 then processes an account authentication request and determines whether the authentication cryptogram is valid for the transaction, and if so, determines a first payment card account number (and corresponding actual account name) which is linked to the EPIC account. The acquirer 482 then analyzes the first account number to determine the appropriate card association or entity to next process the transaction approval request, and forms an approval request 512 for account 1 which is communicated to a first card association 514, which sends an approval request 516 to the corresponding first issuer 518. The first issuer 518 either approves or denies the transaction, and communicates a response 520 to the first card association 514, which communicates a response 522 to the acquirer 482, in an analogous manner as described in reference to FIG. 1 and FIG. 2.

If the transaction was approved by the first issuer 518, the acquirer 482 communicates a response 424 to the merchant 406 as before. However, if the transaction was denied by the first issuer 518, the acquirer 482 then determines a second payment card account number linked to the EPIC account, and forms an approval request 532 for account 2 which is communicated to a second card association 534, which sends an approval request 536 to the corresponding second issuer 538. The second issuer 538 either approves or denies the transaction, and communicates a response 540 to the second card association 534, which communicates a response 542 to the acquirer 482.

If the transaction was approved using any of the underlying accounts linked to the EPIC card, the response 424 communicated to the merchant 406 indicates which linked account was actually used for the transaction. If the transaction was denied by all linked accounts, the response 424 indicates to the merchant that the transaction was denied.

As can be appreciated, by linking multiple different payment card accounts to a single EPIC account, a customer does not need to carry all the various payment cards in a wallet or purse, yet can still make payments using such payment card accounts. Moreover, if an attempted purchase transaction is denied by one of the linked accounts, the same attempted purchase transaction may be automatically submitted using a second account (and if necessary, a third account, a fourth account, and so on) so that an approved transaction may be accomplished quickly and without embarrassment at the retail establishment.

Figure 19:
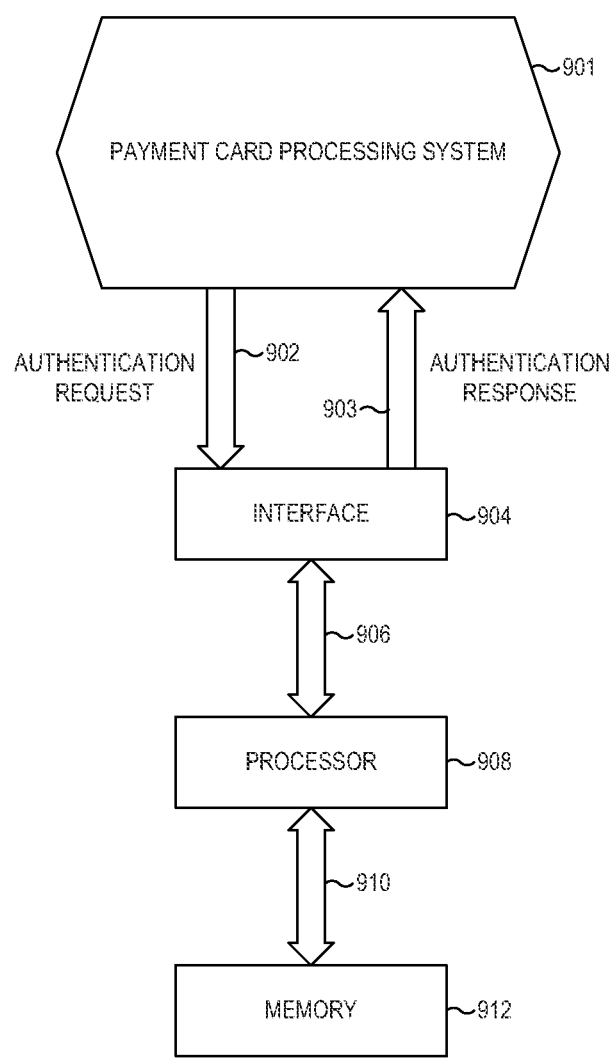
FIG. 19 is a block diagram depicting an exemplary authentication server.

FIG. 19 is a block diagram depicting an exemplary authentication server 900, which includes a processor 908, a memory (i.e., storage device) 912, and an interface 904. The processor 908 receives (through the interface 904) an authentication request 902 from an entity within the payment card processing system 901. Such an entity may include an acquirer entity, a card association entity, or issuing bank entity. The authentication request 902 includes a payment card identifying number and an authentication cryptogram, which may be conveyed in a payment card account name field, and may be alpha-numerically encoded. The processor 908 retrieves from the memory 912 a seed value that corresponds to the payment card identifying number, then generates a reference authentication cryptogram based at least in part on the seed value and a temporal signal value associated with the authentication request. The processor 908 determines whether the received authentication cryptogram matches the reference authentication cryptogram, and if so, conveys an authentication response 903 to the entity (by way of the interface 904) which includes a live payment card account number in a payment card account number field, and a corresponding payment card account name in the payment card account name field.

The processor 908 in this figure represents one or more processors, as the above tasks may be performed by one or more than one processor. Suitable processors are well known in the financial services industry, and include processors from Hewlett Packard and IBM. Moreover, the memory 912 represents one or more than one storage system and/or memory device, as data stored within the authentication server 900 may be stored in one or more than one such storage system and/or memory device, each of which may include RAM, disk, flash, ROM, tape, or any other storage medium.

EPIC Account Setup

An EPIC account may be established online to link one or more actual payment card accounts with the EPIC account, including the preferred order that the authentication server should select such linked accounts to use for a given transaction. In addition, a particular payment card account for a given retailer may be selected for use whenever a transaction is being attempted at such retailer. For example, a user may designate a MasterCard account as the first priority account to use, but may also designate a Sears account for use when attempting a purchase at a Sears store.

After entering all credit cards information, the customer may establish the default credit card usage selection process. This process consists simply of selecting from an "Automatic" or "Manual" mode. The "Automatic" option means that during a purchase transaction, the EPIC system defaults to the major credit card selection flow established by the customer. It is modeled around a consumer who carries several major credit cards in their wallet or purse, but who regularly chooses to use a specific card for all daily transactions while leaving the other cards as a backup in the event a transaction is denied, or the "primary" card is not accepted at a particular establishment. Furthermore, if the currently selected credit card fails to authorize payment, the EPIC system will automatically move to the next available credit card for payment authorization of the same purchase transaction. This method will minimize the potential of a customer embarrassment due to a denial of payment authorization.

The "Manual" option provides a customer with the opportunity to manually select the actual credit card that he/she wishes to use during a purchase transaction. This option is useful, for example, for a customer having a corporate credit card who needs the ability to choose which card to use at the moment of the transaction. In some embodiments, an EPIC payment card may include a display and a selection capability directly on the card. For example, an EPIC card may include a membrane switch to scroll through available card accounts sequentially displayed on the card, and select one of the accounts. As another example, an EPIC card may include several switches, each for selecting a corresponding account.

Other techniques for manually selecting a specific account for the next transaction may also be provided. For example, a customer may select the desired account using a mobile phone, either using a browser interface to the EPIC system, or using a native application (iPhone, Android, Blackberry, Windows Phone, Windows Mobile, webOS, etc). For example, after entering a customer-established PIN authorization code, a customer may then view all credit cards in their EPIC account by their description name (or nickname) and card logo, and select the card they wish to use on their next transaction. By using such nicknames or descriptive names, the actual credit card information need not be exposed, either to persons who may be surreptitiously observing the mobile phone display, or by hackers who might compromise the login credentials of the mobile phone application. A separate, more secure login credential may be required for full account access from a computer.

Once the customer has selected the credit card account, the customer can then use their EPIC card for the transaction and the EPIC system will automatically use the pre-selected card to finalize the purchase transaction. When the current transaction is complete, the current selection may remain active for subsequent purchases until changed by the customer, or the EPIC system may default back to the pre-established credit card selection order defined in the EPIC account. The customers may chose to re-define the default order of the card selection usage process at any time when logged in into the EPIC account.

Online and Recurring Transactions

To make purchases online using an EPIC card, a customer may select "Epic Pay" from the available payment methods shown on the vendor's web site, then enter his/her EPIC credentials (e.g., into an account authentication popup window). The customer may optionally select the desired credit card to use for the current transaction, but otherwise the EPIC card defaults to the pre-established credit card account selection order. If all such information is correct, a payment authorization code is generated and provided to the merchant to finalize the transaction. At no time is the customer's actual credit card information ever exposed on the screen, or available to the merchant. Rather, all credit card information is kept strictly confidential between EPIC and the actual credit card company authorizing the credit transaction, as described in the examples above.

Recurring subscription payment services, such as with a monthly service provider (e.g., Netflix, 24-Hour Fitness, DirecTV, Dish Network, etc), may be established within a customer's EPIC online account. For example, a list of service providers accepting the "Epic Recurring Pay" method may be displayed, from which the customer selects a service provider they wish to pay via this service. The system will process the payment requests directly with the service provider without the customer requiring any additional interaction. Such recurring payments may be "pushed" to the service providers, or may be accepted when initiated by the service provider itself. In both cases, the customer can control the recurrence schedule and the maximum dollar amount of the recurring payment transactions, and at any time may "Stop", "Pause" or "Cancel" such payments.

As the above description should make clear, an EPIC payment system, which generates a unique authentication cryptogram per attempted purchase transaction, will make it virtually impossible for credit card fraud. Any previously used or generated authentication cryptograms typically cannot be re-used to authorize a new purchase transaction, since any newly-generated authentication cryptogram is only good for a finite amount of time, preferably measured in seconds. If the newly-generated authentication cryptogram is not authenticated in the specified amount of time, the authentication cryptogram will become obsolete and therefore rendered useless.

As the above description should also make clear, there is no need for a card user to carry any other payment card, since an EPIC card provides the capability to post a transaction using any of the linked payment card accounts, with the benefit that none of linked payment card account numbers will ever be exposed to anyone again.

As used herein, a cryptographic hash function is intended to be viewed in its broadest possible sense, to include any deterministic procedure or algorithm that takes an arbitrary block of data (i.e., a "message") and returns a fixed-size string (i.e., a "message digest"). Such functions are well known in the art, and include MD5, SHA-1, SHA-2, and many others. Common characteristics of particularly useful cryptographic hash functions include (1) it is computationally straightforward to generate the message digest for any given message, (2) if only a given message digest is known, it is infeasible (i.e., even using computational "brute-force" attacks) to generate a message having the given message digest, (3) it is infeasible to modify a message without necessarily changing its message digest value, and (4) it is infeasible that two messages would have the same message digest.

As used herein, "communicating" certain information to a payment processing system is intended to include any form of communication which can convey such information to any entity within the payment processing system. Examples of such entities include a merchant, a point-of-sale terminal, an acquirer, a card association, an issuing bank entity (or other underlying provider of credit, irrespective of whether the "issuing bank entity" is viewed as a "bank" under applicable statute or regulation). A payment processing system may also include an authentication server as described herein. As used herein, a message that is "based upon" certain information (e.g., a seed value) is not necessarily based only upon the certain information, but may also be based upon other information. Consequently, the phrase "based upon" should be viewed in an open-ended sense.

The foregoing detailed description has described only a few of the many possible implementations of the present invention. Moreover, the embodiments described above are specifically contemplated to be used alone as well as in various combinations. For this reason, this detailed description is intended by way of illustration, and not by way of limitations. Variations and modifications of the embodiments disclosed herein may be made based on the description set forth herein. It is only the following claims, including all equivalents, that are intended to define the scope of this invention.

What is claimed is:

1. An authentication method for use in a payment card, said method comprising:
   verifying, within the payment card, a credential presented to the payment card by a payment card user as being a valid credential for the payment card user; then
   generating, within the payment card, a temporal signal value;
   generating, using a processor within the payment card, a message digest based at least in part on a seed value stored within the payment card and the temporal signal value;
   encoding, using the processor within the payment card, at least a portion of the message digest using an alpha-numeric code to form an alpha-numeric authentication cryptogram;
   communicating, using an interface device within the payment card, a payment card identifying number stored within the payment card to a payment processing system; and
   communicating, using the interface device within the payment card, the alpha-numeric authentication cryptogram in a payment card account name field to the payment processing system instead of communicating a payment account name in said payment card account name field.

2. The method as in claim 1 wherein the alpha-numeric authentication cryptogram is encoded to represent any of at least $10^{20}$ values.

3. The method as in claim 1 wherein the alpha-numeric authentication cryptogram is encoded to represent any of at least $32^{20}$ values.

4. The method as in claim 1 wherein:
   the alpha-numeric code has a radix greater than 10; and
   the alpha-numeric authentication cryptogram is at least 20 alpha-numeric characters in length.

5. The method as in claim 4 wherein:
the radix is greater than 16.

6. The method as in claim 1 wherein the payment card identifying number is communicated using a payment card security code field together with a payment card account number field.

7. The method as in claim 1 wherein:
the temporal signal value comprises a real-time value; and
the method further comprises communicating the real-time value to the payment processing system.

8. The method as in claim 1 wherein:
the temporal signal value comprises a sequence value that changes for each attempted payment card use.

9. The method as in claim 1 wherein the payment card identifying number is a static number that represents an actual payment account number.

10. The method as in claim 1 wherein the payment card identifying number is a static number that does not represent an actual payment account number.

11. The method as in claim 10 wherein the payment card identifying number is at least 19 digits in length, and is communicated to the payment processing system using a payment card account number field and a payment card security code field.

12. The method as in claim 1 wherein the credential for the payment card user comprises a personal identification number (PIN) for the payment card user.

13. The method as in claim 1 wherein the credential for the payment card user comprises a fingerprint for the payment card user.

14. A payment card comprising:
an input device operable to receive a credential presented by a payment card user;
a temporal value circuit operable to generate a temporal signal value;
a storage device operable to store a seed value corresponding to the payment card;
a processor operable to verify the credential presented by the payment card user, and further operable to generate a message digest based at least in part on the seed value and the temporal signal value, and to encode at least a portion of the message digest using an alpha-numeric code to form an alpha-numeric authentication cryptogram;
an interface device operable to communicate a payment card identifying number in a payment card account number field to a payment processing system, and further operable to communicate the alpha-numeric authentication cryptogram in a payment card account name field to the payment processing system instead of communicating a payment account name in said payment card account name field.

15. The payment card as in claim 14 wherein the input device comprises a keypad for entry of a personal identification number (PIN) for the payment card user.

16. The payment card as in claim 14 wherein the input device comprises a fingerprint reader.

17. The payment card as in claim 14 wherein the interface device comprises a near-field communications circuit.

18. The payment card as in claim 14 wherein the interface device comprises a re-writable magnetic stripe device.

19. The payment card as in claim 14 wherein:
the temporal value circuit comprises a real-time clock circuit;
the temporal signal value comprises a real-time value; and
the interface device is operable to convey the real-time value to the payment processing system.

20. The payment card as in claim 14 wherein:
the temporal value circuit comprises a sequential instance circuit; and
the temporal signal value comprises a sequence value that changes for each attempted payment card use.

21. The payment card as in claim 14 wherein:
the alpha-numeric code has a radix greater than 16; and
the alpha-numeric authentication cryptogram is at least 20 alpha-numeric characters in length.

22. The payment card as in claim 14 wherein the interface device is operable to communicate the payment card identifying number using a security code field in addition to the account number field.

23. The payment card as in claim 14 wherein the payment card identifying number is a static number that does not represent an actual payment account number.

24. The payment card as in claim 23 wherein the payment card identifying number is embossed or printed on the payment card in a manner discernable to a human eye.

25. The payment card as in claim 23 wherein the payment card identifying number is at least 19 digits in length, and is communicated to the payment processing system using the payment card account number field and a payment card security code field.

26. The method as in claim 1 wherein the temporal signal value comprises a real time value received from the payment processing system.

27. The method as in claim 1 wherein the payment processing system includes a point-of-sale merchant device.

28. The method as in claim 10 wherein:
the alpha-numeric code has a radix of at least 32; and
the alpha-numeric authentication cryptogram is 26 alpha-numeric characters in length.

* * * * *